United States Patent
Sawaragi et al.

(10) Patent No.: US 10,480,933 B2
(45) Date of Patent: Nov. 19, 2019

(54) CONTROL SYSTEM, AND CONTROL METHOD AND PROGRAM FOR CONTROL SYSTEM

(71) Applicant: OMRON Corporation, Kyoto-shi, Kyoto (JP)

(72) Inventors: Hiroshi Sawaragi, Otsu (JP); Mitsuru Nakamura, Uji (JP); Manabu Kawachi, Kishiwada (JP)

(73) Assignee: OMRON Corporation, Kyoto-shi (JP)

( * ) Notice: Subject to any disclaimer, the term of this patent is extended or adjusted under 35 U.S.C. 154(b) by 63 days.

(21) Appl. No.: 15/794,031

(22) Filed: Oct. 26, 2017

(65) Prior Publication Data
US 2018/0120090 A1   May 3, 2018

(30) Foreign Application Priority Data
Oct. 31, 2016   (JP) .................. 2016-213862

(51) Int. Cl.
*G01B 11/02* (2006.01)
*G05B 19/05* (2006.01)
(Continued)

(52) U.S. Cl.
CPC ............ *G01B 11/026* (2013.01); *B23Q 17/20* (2013.01); *G05B 19/054* (2013.01);
(Continued)

(58) Field of Classification Search
CPC ... G01B 11/026; G01B 11/04; G01B 11/0608; G01B 11/0691; G01B 11/24;
(Continued)

(56) References Cited

U.S. PATENT DOCUMENTS

2008/0094643 A1   4/2008   Nishio et al.
2010/0241267 A1*  9/2010   Nishikawa ............. B23Q 17/20
                                                    700/195
(Continued)

FOREIGN PATENT DOCUMENTS

DE   102009039540 A1   4/2010
EP       2230481 A2    9/2010
(Continued)

OTHER PUBLICATIONS

The extended European search report (EESR) dated Mar. 23, 2018 in a counterpart European Patent application.
(Continued)

*Primary Examiner* — Michael A Lyons
(74) *Attorney, Agent, or Firm* — Metrolex IP Law Group, PLLC

(57) ABSTRACT

A PLC system includes a displacement sensor, drives, and a PLC. The PLC system obtains line measurement data including a plurality of pieces of measurement information or 1D information from the displacement sensor and a plurality of pieces of positional information from the drives that are read in accordance with measurement intervals, generates 2D shape data, and generates 2D shape data as 1D arrangement information for every measurement interval from combination line measurement data combining the 1D information and the positional information.

14 Claims, 15 Drawing Sheets

(51) Int. Cl.
*G05B 19/12* (2006.01)
*G05B 19/42* (2006.01)
*B23Q 17/20* (2006.01)
*G05B 19/401* (2006.01)
*G05B 19/4097* (2006.01)

(52) U.S. Cl.
CPC .......... *G05B 19/056* (2013.01); *G05B 19/12* (2013.01); *G05B 19/401* (2013.01); *G05B 19/4097* (2013.01); *G05B 19/42* (2013.01); *G05B 2219/37063* (2013.01); *G05B 2219/37117* (2013.01); *G05B 2219/49007* (2013.01)

(58) Field of Classification Search
CPC ......... G06T 7/521; G06T 7/50; G05B 19/401; G05B 19/42; G05B 2219/37063; G05B 2219/37117; G05B 2219/49007

See application file for complete search history.

(56) References Cited

U.S. PATENT DOCUMENTS

| | | | |
|---|---|---|---|
| 2015/0012243 A1* | 1/2015 | Honda | G03F 7/70558 |
| | | | 702/155 |
| 2015/0016709 A1* | 1/2015 | Toyoda | H01J 37/222 |
| | | | 382/149 |
| 2015/0254829 A1* | 9/2015 | Araki | G01B 11/24 |
| | | | 382/141 |
| 2016/0305777 A1* | 10/2016 | Racine | G01B 21/00 |
| 2018/0010962 A1* | 1/2018 | Kanetani | G01J 1/4228 |

FOREIGN PATENT DOCUMENTS

| | | |
|---|---|---|
| JP | 2008-256637 A | 10/2008 |
| JP | 2010-58238 A | 3/2010 |
| JP | 2012-103266 A | 5/2012 |
| JP | 2012-177620 A | 9/2012 |
| JP | 2015127815 A * | 7/2015 |
| JP | 2015-165210 A | 9/2015 |

OTHER PUBLICATIONS

Chinese Office Action dated Aug. 5, 2019 in a counterpart Chinese Patent application.

* cited by examiner

CONTROL SYSTEM, AND CONTROL METHOD AND PROGRAM FOR CONTROL SYSTEM

CROSS REFERENCE TO RELATED APPLICATIONS

This application claims priority from prior Japanese Patent Application No. 2016-213862 filed with the Japan Patent Office on Oct. 31, 2016, the entire contents of which are incorporated herein by reference.

FIELD

The disclosure relates to a control system involving a control application for measuring the shape of an object, and a control method and a control program for the control system.

BACKGROUND

Machines and equipment used at many production sites are controlled by controllers such as a programmable logic controller (PLC). A control system known in the art controls a measurement device using such a controller to measure the shape of an object. For example, Patent Literature 1 describes a control system for measuring the shape of an object using a line sensor (two-dimensional displacement) as a measurement device.

CITATION LIST

Patent Literature

Patent Literature 1: Japanese Unexamined Patent Application Publication No. 2012-103266

SUMMARY

Technical Problem

In the control system described in Patent Literature 1, the line sensor (two-dimensional displacement) obtains measurement information including information such as an X-directional position and a Z-directional height. Thus, when the control system described in Patent Literature 1 has a higher measurement resolution, the system performs a larger number of measurements, increasing the amount of obtained information about X-directional positions and Z-directional heights, as the amount of information is multiplied by the number of measurements. This increases the volume of shape data, which uses a large space of memory or increases the load of calculation in, for example, comparing two pieces of shape data.

One or more aspects are directed to a control system that reduces the size of shape data, and a control method and a program for the control system.

Solution to Problem

One aspect provides a control system including a measurement device that obtains one-dimensional information about an object, a drive that changes a relative position of the measurement device relative to the object, and a controller that controls the measurement device and the drive to obtain information about a two-dimensional shape or a three-dimensional shape of the object based on the one-dimensional information obtained by the measurement device. The controller includes a measurement data obtaining unit that obtains measurement data including a plurality of pieces of one-dimensional information from the measurement device and a plurality of pieces of positional information from the drive that are read in accordance with measurement intervals, and a shape data generation unit that generates two-dimensional shape data or three-dimensional shape data based on the measurement data obtained by the measurement data obtaining unit. The shape data generation unit generates the shape data as one-dimensional arrangement information for every measurement interval from combination measurement data combining the one-dimensional information and the positional information.

In some embodiments, the control system further includes a feature quantity calculation unit that calculates a feature quantity of the object based on the shape data generated by the shape data generation unit.

In some embodiments, the feature quantity calculation unit compares pieces of one-dimensional arrangement information for two pieces of shape data generated by the shape data generation unit, and calculates a feature quantity using a result of comparison between the two pieces of shape data.

In some embodiments, the shape data generation unit defines a measurement range and measurement intervals for measuring the object.

In some embodiments, the controller functioning as a master device and the measurement device and the drive functioning as slave devices are connected through a network.

Another aspect provides a control method used by a controller for controlling a measurement device that obtains one-dimensional information about an object, and a drive that changes a relative position of the measurement device relative to the object to obtain information about a two-dimensional shape or a three-dimensional shape of the object based on the one-dimensional information obtained by the measurement device. The method includes obtaining measurement data including a plurality of pieces of one-dimensional information from the measurement device and a plurality of pieces of positional information from the drive that are read in accordance with measurement intervals, and generating two-dimensional shape data or three-dimensional shape data based on the obtained measurement data. Generating the shape data includes generating the shape data as one-dimensional arrangement information for every measurement interval from combination measurement data combining the one-dimensional information and the positional information.

Another aspect provides a program for a controller that controls a measurement device that obtains one-dimensional information about an object, and a drive that changes a relative position of the measurement device relative to the object to obtain information about a two-dimensional shape or a three-dimensional shape of the object based on the one-dimensional information obtained by the measurement device. The program causes a processor included in the controller to implement defining a measurement range and measurement intervals for measuring the object, obtaining measurement data including a plurality of pieces of one-dimensional information from the measurement device and a plurality of pieces of positional information from the drive that are read in accordance with the defined measurement intervals, and generating two-dimensional shape data or three-dimensional shape data based on the obtained measurement data. Generating the shape data includes generating the shape data as one-dimensional arrangement information for every measurement interval from combination measurement data combining the one-dimensional information and the positional information.

Advantageous Effects

The control system according to these aspects generates shape data as one-dimensional (1D) arrangement information for every measurement interval from combination measurement data combining 1D information and positional information, and thus generates the shape data smaller than shape data generated as equivalent to measurement data.

DETAILED DESCRIPTION

Figure 1:
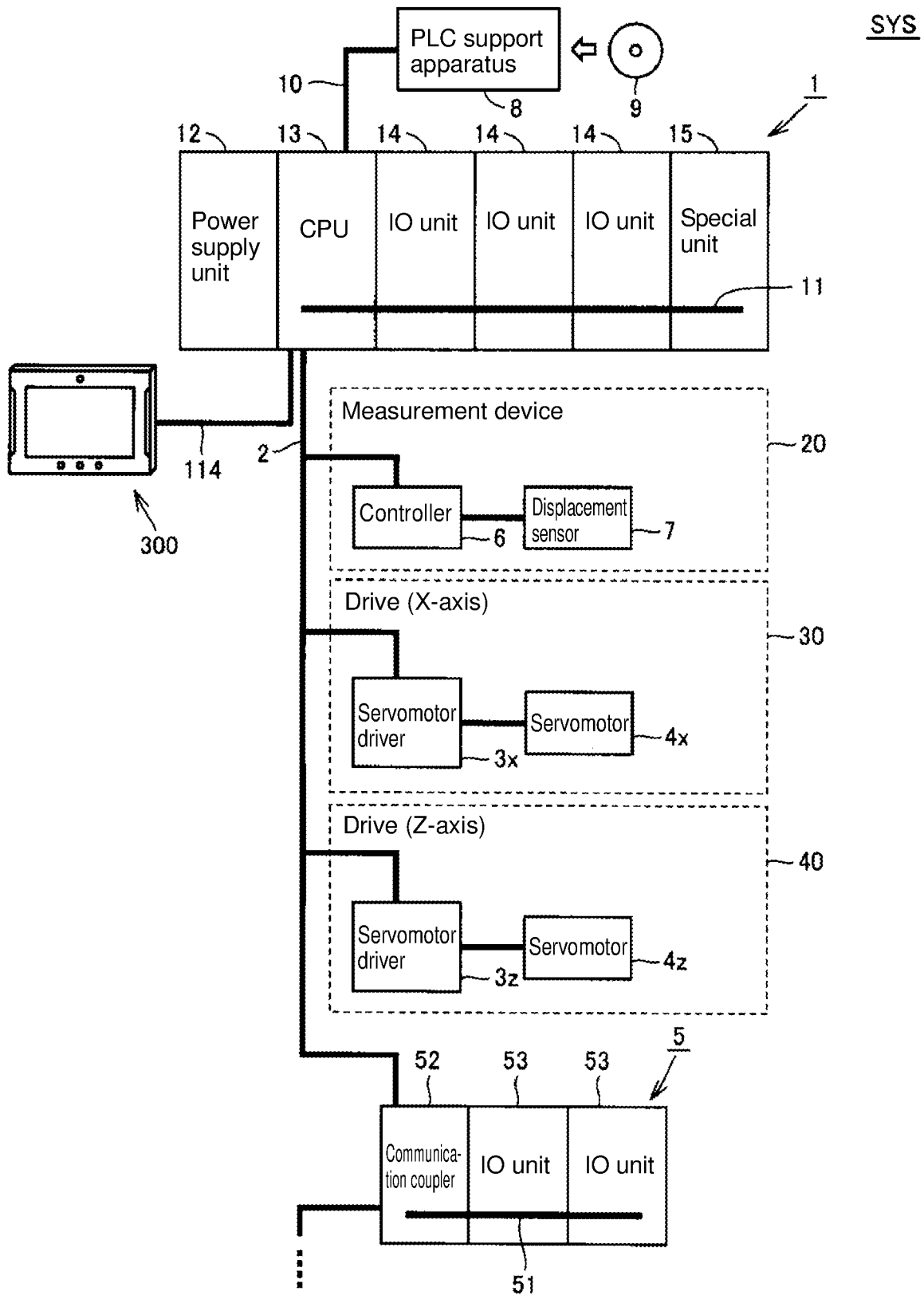
FIG. 1 is a schematic diagram illustrating a control system according to one or more embodiments.

Embodiments will now be described in detail with reference to the drawings. In the figures, the same reference numerals denote the same or corresponding parts.

A. Control System Configuration

A control system according to one or more embodiments has the control function of controlling a measurement device and a drive to obtain information about the two-dimensional (2D) or three-dimensional (3D) shape of an object. The configuration of a PLC system SYS, which is the control system according to one or more embodiments, will now be described with reference to FIG. 1.

FIG. 1 is a schematic diagram of the control system according to one or more embodiments. The PLC system SYS, which is the control system, includes a PLC 1, servomotor drivers 3x and 3z, a remote IO terminal 5, and a controller 6. The servomotor drivers 3x and 3z, the remote IO terminal 5, and the controller 6 are connected to the PLC 1 with a field network 2. The PLC 1 is also connected to a PLC support apparatus with, for example, a connection cable 10, and to a programmable display 300 with a network 114.

The controller 6 is connected to a displacement sensor 7 for obtaining one-dimensional (1D) information about an object (e.g., information including the height of the object and the distance to the object). The controller 6 and the displacement sensor 7 form a measurement device 20. The servomotor driver 3x drives a servomotor 4x for the X-axis. The servomotor driver 3x and the servomotor 4x form a drive 30 for the X-axis. The servomotor driver 3z drives a servomotor 4z for the Z-axis. The servomotor driver 3z and the servomotor 4z form a drive 40 for the Z-axis. The controller 6 and the displacement sensor 7 may be integrated into a single unit.

Figure 2:
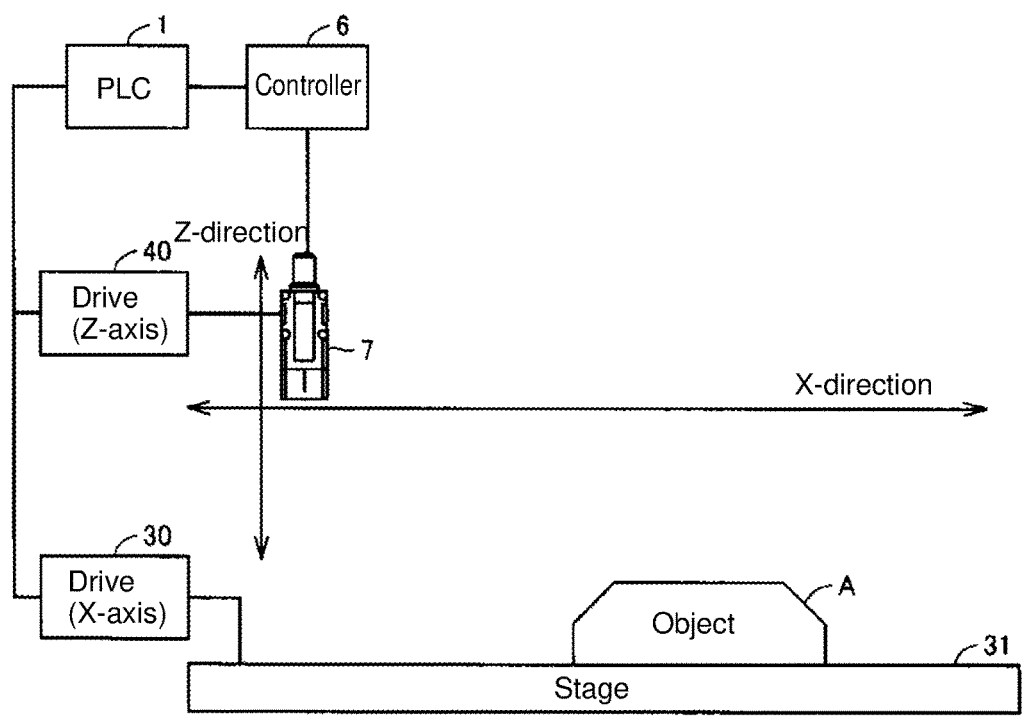
FIG. 2 is a schematic diagram illustrating measurement in a control system according to one or more embodiments.

The PLC system SYS, which has the control function for obtaining information about the 2D shape of an object, will now be described. The measurement performed in the PLC system SYS for obtaining the information about the 2D shape of an object will be described first. FIG. 2 is a schematic diagram describing the measurement in the control system according to one or more embodiments. In FIG. 2, the drive 30 is used for a stage 31 to move an object A placed on the stage 31 in X-direction in the figure, and the drive 40 is used for the displacement sensor 7 to move the displacement sensor 7 in Z-direction in the figure. The relative position of the measurement device 20 relative to the object A is changed by moving the stage 31 in X-direction using the drive 30 and moving the displacement sensor 7 in Z-direction using the drive 40.

The controller 6 is connected to the displacement sensor 7 to obtain measurement information from the displacement sensor 7. The measurement information obtained by the controller 6 is transmitted to the PLC 1 and processed in the PLC 1 as described later. The PLC 1 transmits position commands to the drives 30 and 40 to change the positions of the displacement sensor 7 and the stage 31.

Referring back to FIG. 1, the components will be described in more detail. The PLC 1 includes a CPU 13 responsible for main calculation, one or more IO units 14, and a special unit 15. These units transmit and receive data between them with a PLC system bus 11. These units are powered by a power supply unit 12 with an appropriate voltage. The units included in the PLC 1 are provided by its PLC manufacturer. The PLC system bus 11 is thus typically developed by and used independently by each individual PLC manufacturer. In contrast, the field network 2 may often follow open standards as described later to connect products developed by different manufacturers.

Figure 3:
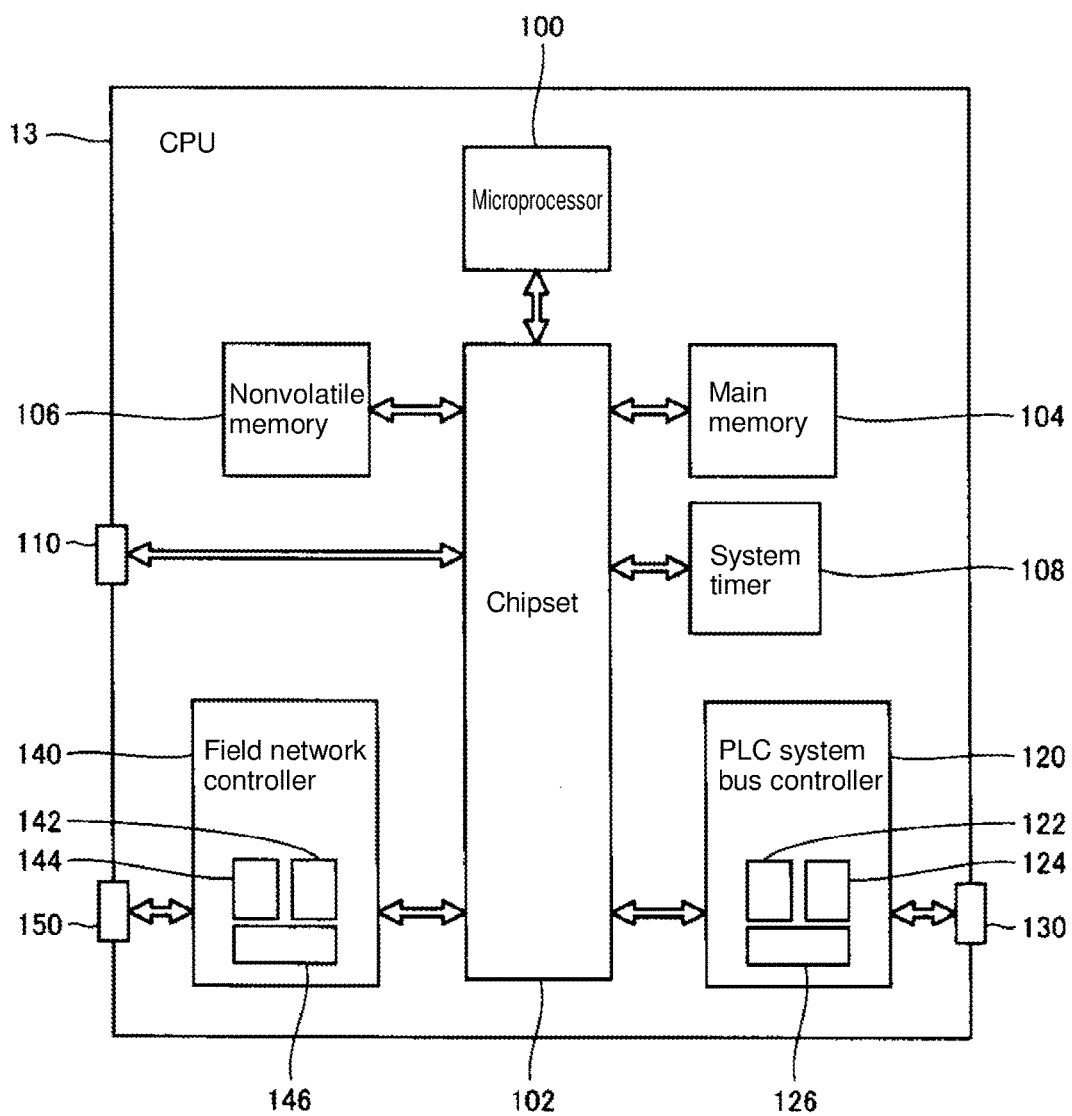
FIG. 3 is a schematic diagram illustrating the hardware configuration of a CPU according to one or more embodiments.

The CPU 13 will be described in detail later with reference to FIG. 3. The IO unit 14 performs typical input and output processing, and handles input and output of binary data indicating the on or off state. More specifically, the IO unit 14 collects information indicating that a sensor has detected any object (on state) or has detected no object (off state). The IO unit 14 also outputs, to a relay or an actuator, a command for activating (turning on) or a command for deactivating (turning off) the relay or the actuator.

The special unit 15 has the functions unsupported by the IO unit 14, such as input and output of analog data, temperature control, and communication under a specific communication scheme.

The field network 2 can carry various types of data transmitted to and received from the CPU 13. The field network 2 may be typically any industrial Ethernet (registered trademark) network. Examples of such industrial Ethernet (registered trademark) networks include EtherCAT (registered trademark), Profinet IRT, MECHATROLINK (registered trademark)-III, Powerlink, SERCOS (registered trademark)-III, and CIP Motion networks. A field network other than these industrial Ethernet (registered trademark) networks may also be used. For example, a field network without involving motion control may conform to DeviceNet or CompoNet/IP (registered trademark). The field network 2 included in the PLC system SYS according to one or more embodiments typically conforms to EtherCAT (registered trademark), which is industrial Ethernet (registered trademark).

Although the PLC system SYS shown in FIG. 1 includes both the PLC system bus 11 and the field network 2, the system may include one of the PLC system bus 11 and the field network 2. For example, the field network 2 may connect all the units. In some embodiments, the servomotor drivers 3x and 3z may be directly connected to the PLC system bus 11 without using the field network 2. In other embodiments, a communication unit for the field network 2 may be connected to the PLC system bus 11, and the communication unit may allow the CPU 13 to communicate with a device connected to the field network 2.

The servomotor drivers 3x and 3z are connected to the CPU 13 with the field network 2, and drive the servomotors 4x and 4z in accordance with command values received from the CPU 13. More specifically, the servomotor drivers 3x and 3z receive command values such as a position command, a speed command, and a torque command from the PLC 1 in fixed cycles. The servomotor drivers 3x and 3z also obtain measurement values associated with the operation of the servomotors 4x and 4z, including the values indicating a position, a speed (typically calculated based on the difference between the current position and the previous position), and a torque, from detectors such as position sensors (rotary encoders) and torque sensors that are connected to the shafts of the servomotors 4x and 4z. The servomotor drivers 3x and 3z then perform feedback control using target values set at the command values received from the CPU 13 and using the measurement values set as feedback values. More specifically, the servomotor drivers 3x and 3z adjust the electric current for driving the servomotors 4x and 4z to cause the measurement values to approach the target values. The servomotor drivers 3x and 3z may also be referred to as servomotor amplifiers.

Although FIG. 1 shows an example system including the servomotors 4x and 4z combined with the servomotor drivers 3x and 3z, the system may have another configuration including, for example, a pulse motor combined with a pulse motor driver.

The displacement sensor 7 obtains 1D information (e.g., height information) about the object A. The displacement sensor 7 may implement contactless measurement using a magnetic field, light, or sound waves, or contact measurement using a dial gauge or a differential transformer. The displacement sensor 7 that uses light may perform triangulation measurement, confocal measurement, or measurement based on other schemes. The displacement sensor 7 according to one or more embodiments described herein is a contactless white confocal displacement sensor.

The controller 6 converts the 1D information about the object A obtained by the displacement sensor 7 into digital information, and outputs the digital information to the CPU 13. For the displacement sensor 7 that is a contactless white confocal displacement sensor, the controller 6 includes a white light-emitting diode (LED), which is a white light source, a branch optical fiber, a spectrometer, an imaging device, and a control circuit (all not shown).

The stage 31 and the displacement sensor 7 are mounted on screw sliders. The sliders are moved by driving the servomotors 4x and 4z. These sliders may be any other sliders that have similar functions. For example, the stage 31 and the displacement sensor 7 may be mounted on linear sliders.

The field network 2 in the PLC system SYS shown in FIG. 1 is further connected to the remote IO terminal 5. The remote IO terminal 5 performs typical input and output processing substantially similarly to the IO unit 14. More specifically, the remote IO terminal 5 includes a communication coupler 52 responsible for processing associated with data transmission with the field network 2 and one or more IO units 53. These units transmit and receive data between them with a remote IO terminal bus 51.

In the PLC system SYS, the CPU 13 in the PLC 1 functions as a master device in the EtherCAT network, whereas the servomotor drivers 3x and 3z, the controller 6, and the communication coupler 52 function as slave devices in the EtherCAT network. The master device may not be the CPU 13 but may be an additional unit.

The PLC support apparatus 8 allows a user to create a project that includes a user program, system configuration information indicating the system configuration (device configuration), and a variable table. The PLC support apparatus 8 is typically implemented by a general-purpose computer. The hardware configuration of the PLC support apparatus 8 includes a CPU, a read-only memory (ROM), a random-access memory (RAM), a hard disk drive (HDD), a keyboard with a mouse, a display, and a communication interface (IF) (all not shown). Various programs to be executed by the PLC support apparatus 8 are stored in a compact disk read-only memory (CD-ROM) 9 and distributed. The programs may also be downloaded from an upper host computer through a network.

The programmable display 300 shows various items of information obtained from the PLC 1 on its screen. The user can operate the programmable display 300 to change the values of input variables stored in the PLC 1. The hardware configuration of the programmable display 300 includes a CPU, a ROM, a RAM, a flash ROM, a clock, operation keys, a camera, a touchscreen, and a communication interface.

B. Hardware Configuration of CPU

The hardware configuration of the CPU 13 will now be described with reference to FIG. 3. FIG. 3 is a schematic diagram showing the hardware configuration of the CPU according to one or more embodiments. In FIG. 3, the CPU 13 includes a microprocessor 100, a chipset 102, a main memory 104, a nonvolatile memory 106, a system timer 108, a PLC system bus controller 120, a field network controller 140, and a USB connector 110. The chipset 102 is coupled to the other components with various buses.

The microprocessor 100 and the chipset 102 are typically components defined in a general-purpose computer architecture. More specifically, the microprocessor 100 interprets and executes instruction codes sequentially fed from the chipset 102 in accordance with the internal clock. The chipset 102 transmits and receives internal data to and from the connected components, and generates an instruction code to be used by the microprocessor 100. The chipset 102 also caches the data resulting from calculation performed by the microprocessor 100.

The CPU 13 includes the main memory 104 and the nonvolatile memory 106 as storage.

The main memory 104, which is a volatile storage area (or RAM), stores various programs to be executed by the microprocessor 100 after the CPU 13 is powered on. The main memory 104 also serves as working memory to be used when the microprocessor 100 executes various programs. The main memory 104 may be a device such as a dynamic random access memory (DRAM) or a static random access memory (SRAM).

The nonvolatile memory 106 stores data including a real-time operating system (OS), a system program for the PLC 1, a user program, a motion calculation program, and system setting parameters in a nonvolatile manner. These programs and data are copied as appropriate to the main memory 104 to allow access from the microprocessor 100. The nonvolatile memory 106 may be semiconductor memory such as flash memory. In some embodiments, the nonvolatile memory 106 may be a magnetic recording medium, such as a hard disk drive, or an optical recording medium, such as a digital versatile disk random access memory (DVD-RAM).

The system timer 108 generates an interrupt signal in fixed cycles, and transmits the interrupt signal to the microprocessor 100. Although the hardware specification typically defines interrupt signals to be generated in multiple different cycles, the operating system (OS) or the basic input output system (BIOS) may cause interrupt signals to be generated in predetermined cycles. The interrupt signals generated by the system timer 108 are used to perform a control operation for each motion control cycle, which will be described later.

The CPU 13 includes the PLC system bus controller 120 and the field network controller 140 as communication circuits.

A buffer memory 126 functions as a transmission buffer for data output to another unit with the PLC system bus 11 (hereafter, output data) and as a reception buffer for data input from another unit with the PLC system bus 11 (hereafter, input data). The output data produced through calculation by the microprocessor 100 is initially stored into the main memory 104. The output data to be transferred to a particular unit is read from the main memory 104, and is temporarily stored in the buffer memory 126. The input data transferred from another unit is temporarily stored in the buffer memory 126, and is then transferred to the main memory 104.

A DMA control circuit 122 transfers output data from the main memory 104 to the buffer memory 126 and input data from the buffer memory 126 to the main memory 104.

A PLC system bus control circuit 124 transmits output data in the buffer memory 126 and receives input data to and from another unit connected to the PLC system bus 11. The PLC system bus control circuit 124 stores the received input data into the buffer memory 126. The PLC system bus control circuit 124 typically provides the functions of the physical layer and the data link layer in the PLC system bus 11.

The field network controller 140 controls data communication through the field network 2. More specifically, the field network controller 140 controls transmission of output data and reception of input data in accordance with the standards for the field network 2 that is used. As described above, the field network 2 in one or more embodiments conforms to the EtherCAT (registered trademark) standard, and thus includes the field network controller 140 with the hardware for normal Ethernet (registered trademark) communication. The EtherCAT (registered trademark) standard allows a common Ethernet (registered trademark) controller to implement a communication protocol following the normal Ethernet (registered trademark) standard. However, a specialized Ethernet (registered trademark) controller with a dedicated communication protocol different from normal communication protocols may be used depending on the type of industrial Ethernet (registered trademark) used for the field network 2. For a field network following a standard other than industrial Ethernet (registered trademark), a dedicated field network controller for this standard is used.

A DMA control circuit 142 transfers output data from the main memory 104 to a buffer memory 146 and input data from the buffer memory 146 to the main memory 104.

A field network control circuit 144 transmits output data in the buffer memory 146 and receives input data to and from another device connected to the field network 2. The field network control circuit 144 stores the received input data into the buffer memory 146. The field network control circuit 144 typically provides the functions of the physical layer and the data link layer in the field network 2.

The USB connector 110 is a connecting interface between the PLC support apparatus 8 and the CPU 13. Typically, a program transferred from the PLC support apparatus 8 and executable by the microprocessor 100 included in the CPU 13 is incorporated into the PLC 1 through the USB connector 110.

C. Software Configuration of CPU

A software set for providing various functions according to one or more embodiments will now be described with reference to FIG. 4. The software set includes an instruction code to be read as appropriate and executed by the microprocessor 100 included in the CPU 13.

Figure 4:
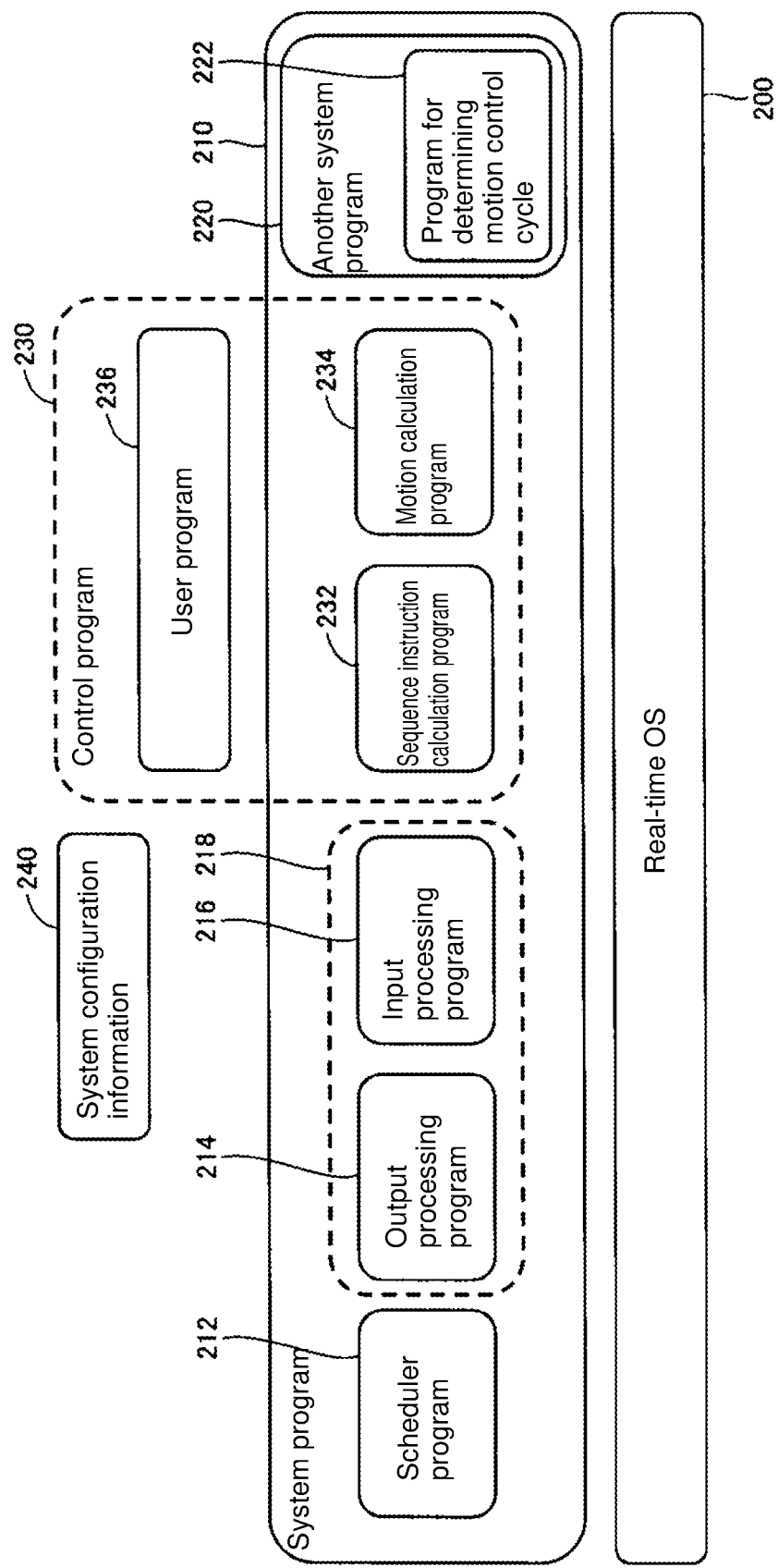
FIG. 4 is a schematic diagram illustrating the configuration of software executed in a CPU according to one or more embodiments.

FIG. 4 is a schematic diagram showing the configuration of software executed in the CPU according to one or more embodiments. In FIG. 4, the software executed in the CPU 13 has three layers: a real-time OS 200, a system program 210, and a user program 236.

The real-time OS 200 is designed with the computer architecture of the CPU 13, and provides a basic execution environment for the microprocessor 100 to execute the system program 210 and the user program 236. The real-time OS is typically provided by the PLC manufacturer or by a specialized software company.

The system program 210 is a software set for providing the functions of the PLC 1. More specifically, the system program 210 includes a scheduler program 212, an output processing program 214, an input processing program 216, a sequence instruction calculation program 232, a motion calculation program 234, and another system program 220. The output processing program 214 and the input processing program 216, which are typically executed sequentially (together), may also be collectively referred to as an IO processing program 218.

The user program 236 is generated in accordance with the control purpose of the user. More specifically, the program is designed freely depending on the line (process) to be controlled using the PLC system SYS.

The user program 236 achieves the control purpose of the user in cooperation with the sequence instruction calculation program 232 and the motion calculation program 234. More specifically, the user program 236 uses an instruction, a function, and a functional module provided by the sequence instruction calculation program 232 and the motion calculation program 234 to achieve a programmed operation. Thus, the user program 236, the sequence instruction calculation program 232, and the motion calculation program 234 may also be collectively referred to as a control program 230.

In this manner, the microprocessor 100 included in the CPU 13 executes the system program 210 and the user program 236 stored in the storage.

Each program will now be described in more detail.

As described above, the user program 236 is generated in accordance with the control purpose of the user (e.g., a target line or a target process). The user program 236 is typically in the format of an object program executable by the microprocessor 100 included in the CPU 13. The user program 236 is generated by, for example, the PLC support apparatus 8 compiling a source program written in a programming language, such as a ladder language. The generated user program 236 in the object program format is transferred from the PLC support apparatus 8 to the CPU 13 with the connection cable 10, and is stored into, for example, the nonvolatile memory 106.

The scheduler program 212 controls the processing start and the processing restart after interruption of the output processing program 214, the input processing program 216, and the control program 230 in each execution cycle. More specifically, the scheduler program 212 controls execution of the user program 236 and the motion calculation program 234.

In the CPU 13 according to one or more embodiments, a fixed execution cycle (motion control cycle) appropriate for the motion calculation program 234 is used as a common cycle for the entire processing. Completing the entire processing within one motion control cycle is thus difficult. Based on the priorities assigned to the processing to be executed, the entire processing is thus divided into processing tasks to be executed within each motion control cycle (including primary cyclic tasks) and processing tasks that may be executed across multiple motion control cycles (including cyclic tasks and event tasks). The scheduler program 212 manages, for example, the execution order of such processing tasks. More specifically, the scheduler program 212 executes the programs in descending order of the assigned priorities within each motion control cycle.

The output processing program 214 reprocesses the output data generated through execution of the user program 236 (control program 230) into a format appropriate for data transfer to the PLC system bus controller 120 and/or to the field network controller 140. The PLC system bus controller 120 or the field network controller 140 that performs data transmission in response to an instruction from the microprocessor 100 receives the instruction generated and output by the output processing program 214.

The input processing program 216 reprocesses the input data received by the PLC system bus controller 120 and/or the field network controller 140 into a format appropriate for use by the control program 230.

The sequence instruction calculation program 232 is called when a certain sequence instruction used in the user program 236 is executed. The sequence instruction calculation program 232 then enables the processing corresponding to the instruction. Examples of the sequence instruction calculation program 232 include a program for generating 2D shape data about the object A based on the measurement data obtained from the measurement device 20 and a program for calculating feature quantities such as the height and the cross-sectional area based on the generated shape data, as described later.

The motion calculation program 234 is executed in accordance with an instruction generated based on the user program 236. The motion calculation program 234 reads measurement information from the controller 6, and calculates a position command to be output to the servomotor drivers 3x and 3z.

The other system program 220 is a set of programs that enable various functions of the PLC 1 other than the programs individually shown in FIG. 4. The other system program 220 includes a program 222 for determining the motion control cycle.

The motion control cycle may be determined as appropriate in accordance with the control purpose. Typically, the user enters information indicating the motion control cycle into the PLC support apparatus 8. The entered information is then transferred from the PLC support apparatus 8 to the CPU 13. The program 222 for determining the motion control cycle stores the information transmitted from the PLC support apparatus 8 into the nonvolatile memory 106, and sets the system timer 108 so that an interrupt signal is generated in motion control cycles specified by the system timer 108. When the CPU 13 is powered on, the program 222 for determining the motion control cycle is executed. This causes information indicating the motion control cycle to be read from the nonvolatile memory 106. The system timer 108 is then set in accordance with the read information.

The format of the information indicating the motion control cycle may be, for example, the time value indicating the motion control cycle, or information (a number or a character) specifying one of predetermined multiple choices about the motion control cycle.

The CPU 13 according to one or more embodiments includes a device for determining the motion control cycle corresponding to an element used to freely determine the motion control cycle, such as a communication unit that communicates with the PLC support apparatus 8 and to obtain information indicating the motion control cycle, the program 222 for determining the motion control cycle, and the system timer 108 that freely determines the generation cycle of the interrupt for determining the motion control cycle.

The real-time OS 200 provides an environment in which multiple programs are switched over time and executed. The PLC 1 according to one or more embodiments initially sets an output preparation interrupt (P) and a field network transmission interrupt (X) as an event (interrupt) for outputting (transmitting), to another unit or another device, output data generated by the CPU 13 executing a program. In response to the output preparation interrupt (P) or the field network transmission interrupt (X), the real-time OS 200 switches a target executed by the microprocessor 100 from the program that is currently being executed when the interrupt is generated to the scheduler program 212. When neither the scheduler program 212 nor any program for which execution is controlled by the scheduler program 212 is being executed, the real-time OS 200 executes another program included in the system program 210. Examples of such other programs include a program associated with the communication processing performed between the CPU 13 and the PLC support apparatus 8 using the connection (USB) cable 10.

D. Functional Configuration of Control System

Figure 5:
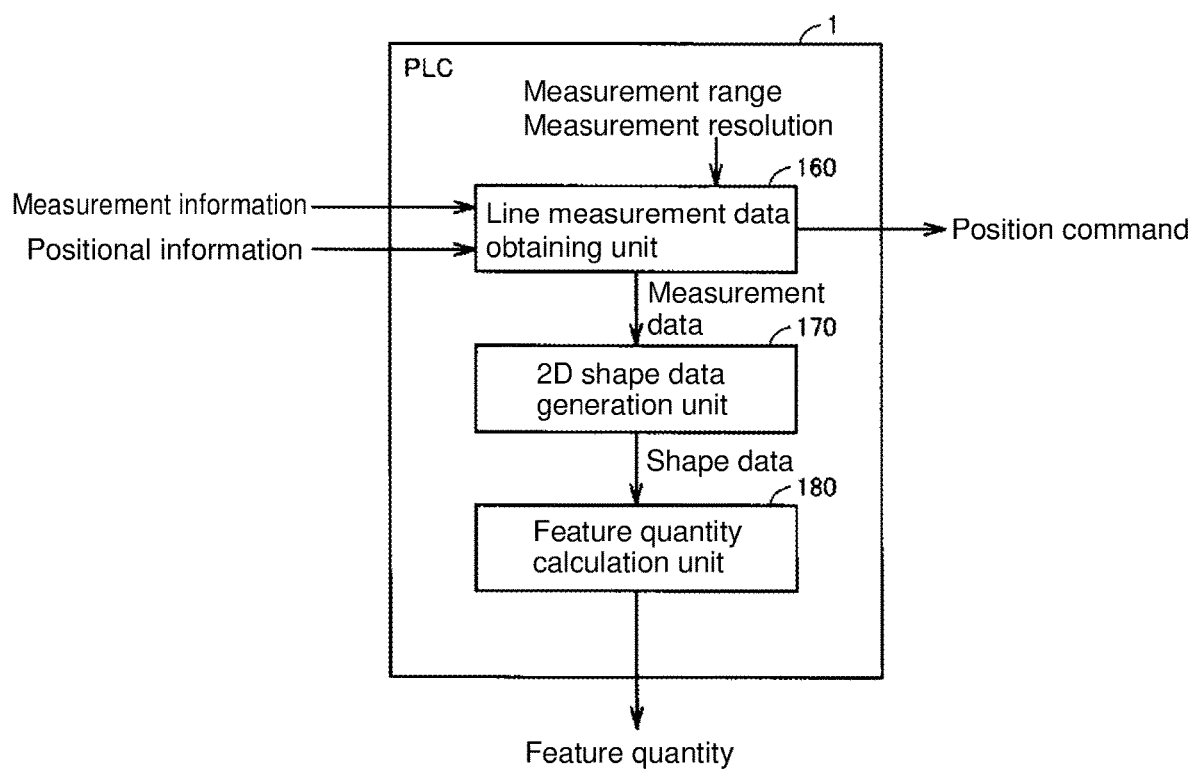
FIG. 5 is a functional block diagram illustrating a control system according to one or more embodiments.

The PLC system SYS then enables the function of obtaining the information about the 2D shape of the object A using the PLC 1 executing the sequence instruction calculation program 232 and the motion calculation program 234. The functional components of the PLC system SYS as the control system will now be described in detail with reference to the drawing. FIG. 5 is a functional block diagram of the control system according to one or more embodiments. To achieve the control function for obtaining information about the 2D shape of an object, the PLC system SYS includes the PLC 1 including a line measurement data obtaining unit 160 and a 2D shape data generation unit 170. The PLC 1 shown in FIG. 5 also includes a feature quantity calculation unit 180, which calculates a feature quantity from the shape data generated by the 2D shape data generation unit 170.

The line measurement data obtaining unit 160 first measures the height of the object A (1D information) while changing the relative position of the displacement sensor 7 relative to the object A, and obtains the measurement result as measurement data. More specifically, the line measurement data obtaining unit 160 outputs command values including a position command to the drives 30 and 40 based on a predetermined measurement range and a predetermined measurement resolution to obtain the measurement data. When the drives 30 and 40 are controlled in accordance with the command values, the line measurement data obtaining unit 160 obtains, for each of the measurement recording positions determined by the measurement resolution, the measurement information from the displacement sensor 7 and the positional information from the drives 30 and 40 as measurement data. The measurement range is from the measurement start position to the measurement end position. The measurement resolution is a measurement interval in X-direction during the measurement.

The drives 30 and 40 are controlled to measure the shape of the object A through either surface search control or trace control. The surface search control causes the displacement sensor 7 to measure the height of the object A within a measurement range by scanning using the height of the displacement sensor 7 maintained within the measurement range. When the height of the object A changes out of the measurement range of the displacement sensor 7 in the surface search control, the height of the displacement sensor 7 is readjusted before measurement to maintain the displacement sensor 7 within the measurement range. The trace control sequentially changes the height of the displacement sensor 7 during the measurement to cause the displacement sensor 7 and the object A to have a constant distance between them.

The 2D shape data generation unit 170 then generates the shape data indicating the 2D shape of the object A based on the measurement data obtained by the line measurement data obtaining unit 160. The measurement data obtained by the line measurement data obtaining unit 160 includes the height of the object A at a position in X-direction within the measurement range. The 2D shape data generation unit 170 performs processing including shape correction of the measurement data based on the inclination of the displacement sensor 7 or its misalignment to generate shape data.

The feature quantity calculation unit 180 then calculates the feature quantities of the object A (e.g., the height and the cross-sectional area) based on the shape data generated by the 2D shape data generation unit 170. The feature quantity calculation unit 180 selects a feature quantity of the object A, for which calculation is to be performed, by allowing the user to select the sequence instruction calculation program 232 included in the user program 236.

E. Control Process Performed by Control System

Figure 6:
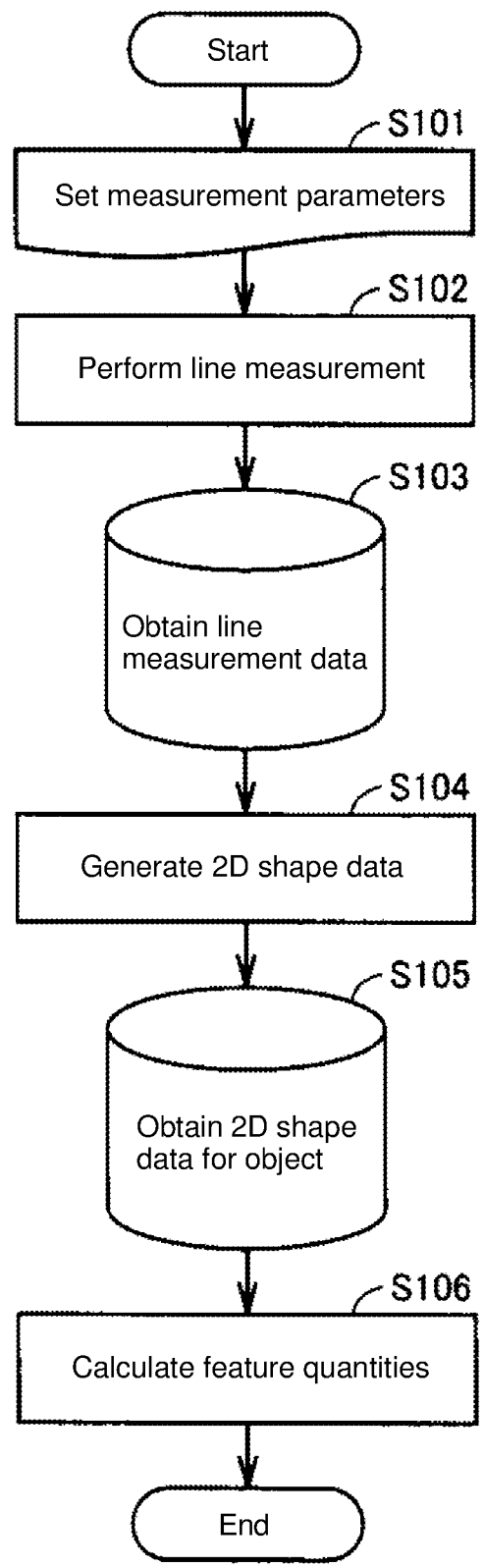
FIG. 6 is a flowchart illustrating a control process performed by a control system according to one or more embodiments.
Figure 7:
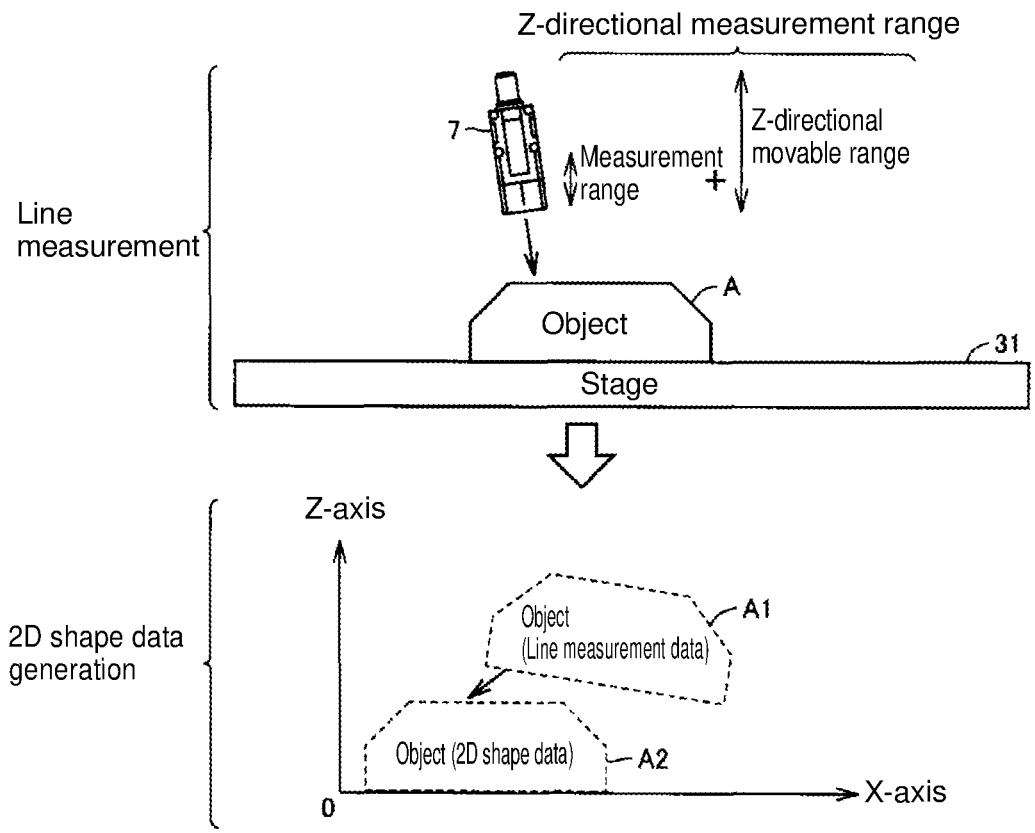
FIG. 7 is a schematic diagram illustrating line measurement and 2D shape data generation performed in a control system according to one or more embodiments.

The functions of the control system according to one or more embodiments shown in FIG. 5 will now be described as a control process performed by the control system. FIG. 6 is a flowchart showing the control process performed by the control system according to one or more embodiments. FIG. 7 is a schematic diagram showing the line measurement and the 2D shape data generation performed in the control system according to one or more embodiments.

When the PLC system SYS starts measurement for obtaining the information about the 2D shape of the object A, the PLC 1 sets measurement parameters (step S101). More specifically, the PLC 1 displays, on the programmable display 300, a prompt for the user to enter the parameters for the measurement start position and the measurement end position, which define the measurement range, and for the measurement resolution. After the user enters the parameters based on the prompt, the PLC 1 stores these parameters. For example, the user sets, as the measurement parameters, the measurement start position at a distance of 10 cm from the reference position (X=0) on the stage 31, the measurement end position at a distance of 30 cm from the reference position on the stage 31, and the measurement resolution of 10 μm. More specifically, the set measurement resolution enables measurement at 20,000 measurement recording positions in the measurement range (measurement breadth) of 20 cm.

Figure 8:
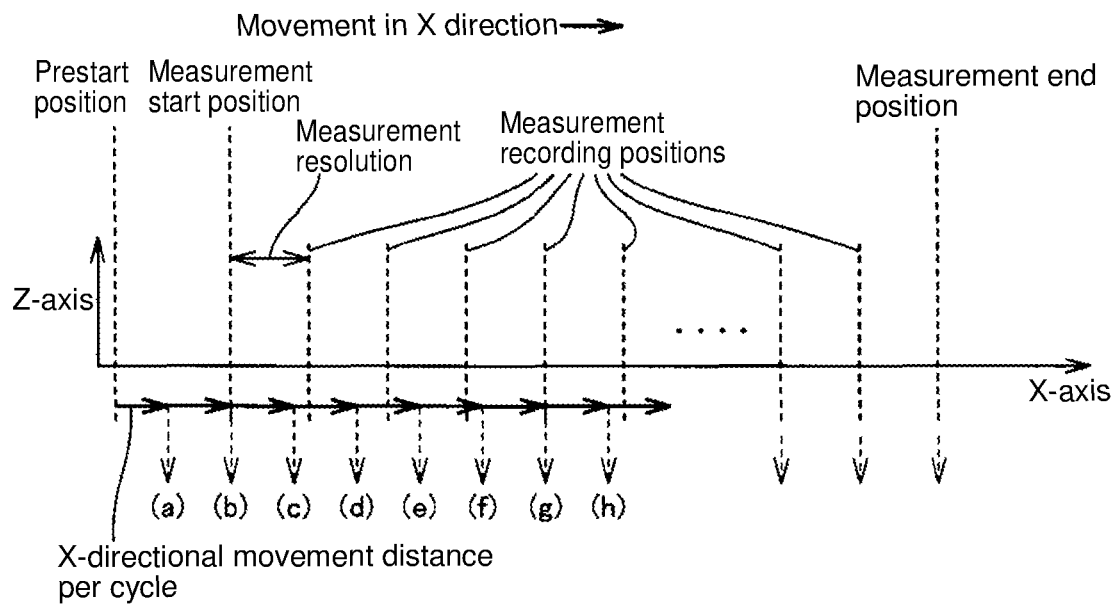
FIG. 8 is a diagram illustrating a measurement resolution used in a control system according to one or more embodiments.

The relationship between the measurement resolution and the measurement recording positions will now be described in more detail. FIG. 8 is a diagram describing the measurement resolution used in the control system according to one or more embodiments. In FIG. 8, the horizontal axis is X-axis, and the vertical axis is Z-axis. FIG. 8 shows the measurement recording positions from a prestart position (X=0) to the measurement end position. The measurement recording positions are determined by dividing the measurement range (range from the measurement start position to the measurement end position) by the measurement resolution. When the X-position of the displacement sensor 7 either reaches or exceeds a measurement recording position, the PLC 1 reads the measurement information (the information about the height of the object A) from the displacement sensor 7 and the positional information (the X-directional position or the X coordinate, and the Z-directional position or the Z coordinate) from the drives 30 and 40 at this position.

More specifically, (a) when the X-position of the displacement sensor 7 does not reach the measurement start position, the PLC 1 does not read the measurement information from the displacement sensor 7 or the positional information from the drives 30 and 40 at this position. When the stage 31 is moved, and (b) the X-position of the displacement sensor 7 reaches the measurement start position, the PLC 1 reads the measurement information from the displacement sensor 7 and the positional information from the drives 30 and 40 at this position. When the stage 31 is moved, and (c) the X-position of the displacement sensor 7 does not reach the first measurement recording position from the measurement start position, the PLC 1 does not read the measurement information from the displacement sensor 7 or the positional information from the drives 30 and 40 at this position. When the stage 31 is moved, and (d) the X-position of the displacement sensor 7 either reaches or exceeds the first measurement recording position from the measurement start position and does not reach the second measurement recording position, the PLC 1 reads the measurement information from the displacement sensor 7 and the positional information from the drives 30 and 40 at this position. Similarly, each time when the stage 31 is moved until the X-position of the displacement sensor 7 either reaches or exceeds one of the second and subsequent measurement recording positions from the measurement start position, the PLC 1 reads the measurement information from the displacement sensor 7 and the positional information from the drives 30 and 40 at this position.

The PLC 1 changes the X-position of the displacement sensor 7 by moving the stage 31 in X-direction using the drive 30. When an X-directional positional change (movement distance) per cyclic task is equal to an interval (including an integer multiple of the interval) between measurement recording positions, any deviation as shown in FIG. 8 will not occur between a measurement recording position and an information read position. An X-directional positional change (movement distance) per cyclic task is calculated by multiplying the X-directional speed by the task cycle. However, for an X-directional positional change (movement distance) per cyclic task that is not equal to an interval (including an integer multiple of the interval) between measurement recording positions, no information is read at some measurement recording positions when the stage 31 is moved in the manner described above. When the stage 31 is moved fast and the X-directional positional change (movement distance) per cyclic task exceeds the measurement resolution, no information can be read at some measurement recording positions. For a measurement resolution of 10 µm and a task cycle of 1 ms, the PLC 1 may move the stage 31 at a speed of 10 mm/s or lower.

Referring back to FIG. 6, the PLC 1 performs line measurement (step S102). The PLC 1 reads measurement information obtained by the displacement sensor 7 from the controller 6 at measurement recording positions while controlling the drive 30 to change the position of the stage 31 in X-direction within the measurement range defined in step S101. As shown in FIG. 7, the displacement sensor 7 during the line measurement measures the height of the object A while passing over the object A in X-direction. The displacement sensor 7, which is a contactless white confocal displacement sensor, has a measurement range of about 2 mm in the height direction. More specifically, with the position of the displacement sensor 7 fixed relative to the stage 31, the displacement sensor 7 can measure the object A with a height of up to 2 mm from the stage 31.

The PLC 1 changes the position of the displacement sensor 7 using the drive 40 to enable measurement of the height of the object A beyond the measurement range of the displacement sensor 7 (about 2 mm). With the drive 40 that can change the position of the displacement sensor 7 by up to about 20 mm (Z-directional movable range), the PLC 1 can measure the height of the object A within a range (Z-directional measurement range) defined by the sum of the measurement range of the displacement sensor 7 (about 2 mm) and the Z-directional movable range (about 20 mm). In other words, the PLC 1 can measure the height of the object A within a range of up to 22 mm in Z-direction.

Referring back to FIG. 6, the PLC 1 obtains line measurement data (step S103) including multiple pieces of measurement information (information about the height of the object A) received from the displacement sensor 7 and multiple pieces of positional information (X-coordinate information and Z-coordinate information) received from the drives 30 and 40, which are obtained at measurement recording positions while the PLC 1 is changing the position of the displacement sensor 7 within the measurement range.

The PLC 1 then generates 2D shape data based on the line measurement data obtained in step S103 (step S104). The 2D shape data is obtained by converting the line measurement data through shape correction (for the inclination, X-direction, and Z-direction). For the displacement sensor 7 inclined as shown in FIG. 7, the line measurement data A1 obtained in step S103 involves the inclination. Additionally, the line measurement data A1 may also involve an X-directional deviation depending on the position of the stage 31, and further a Z-directional deviation depending on the position of the displacement sensor 7. Such deviations are corrected to X=0 and Z=0 at the reference position defined on the stage 31. As shown in FIG. 7, the PLC 1 corrects the line measurement data A1 to generate 2D shape data A2 based on corrected parameters. The 2D shape data A2 is the data that has undergone shape correction (for the inclination, X-direction, and Z-direction).

The PLC 1 further performs interval equalization of the sequence of data points on the line measurement data obtained in step S103. As shown in FIG. 8, the stage 31 moves by an X-directional positional change (movement distance) per cyclic task that is smaller than the interval between measurement recording positions. The line measurement data thus involves a difference between a position at which the measurement information is read from the displacement sensor 7 and a measurement recording position. More specifically, no measurement is performed at the first measurement recording position in FIG. 8, and information is read at the position (d). As a result, the PLC 1 obtains the line measurement data with the X and Z coordinates deviated by the distance from the first measurement recording position to the position (d) in X-direction. The PLC 1 performs interval equalization of the sequence of data points to convert the line measurement data obtained in step S103 into 2D shape data generated at each measurement recording position.

Figure 9:
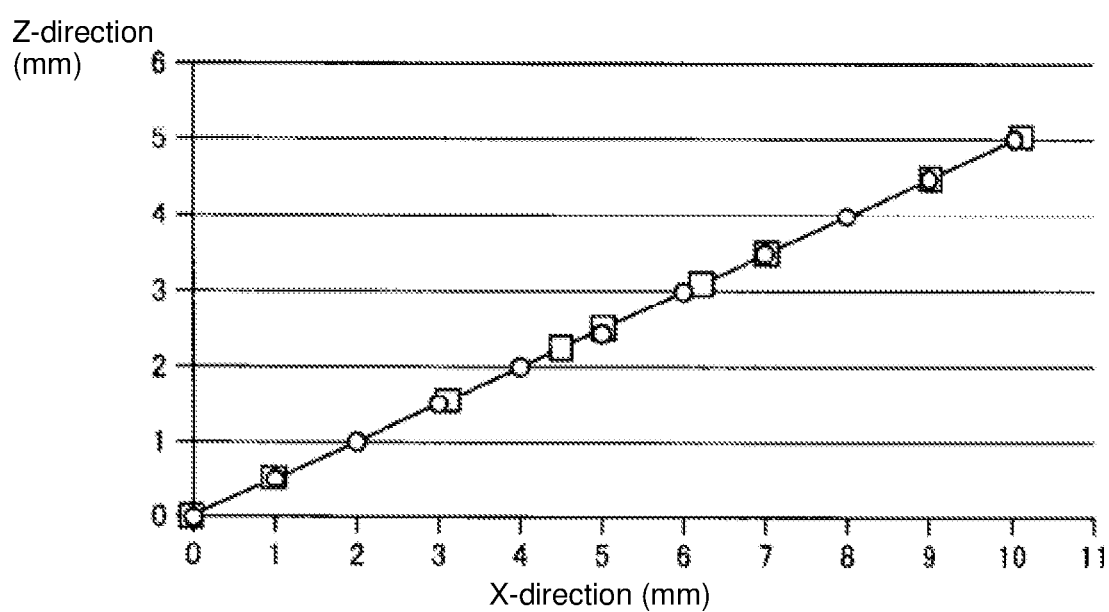
FIG. 9 is a graph illustrating interval equalization for 2D shape data in a control system according to one or more embodiments.

FIG. 9 is a graph showing interval equalization for 2D shape data in the control system according to one or more embodiments. In FIG. 9, the horizontal axis is X-axis, and the vertical axis is Z-axis. FIG. 9 shows measurement information from the displacement sensor 7 (height information about the object A) obtained at distances ranging from 0 mm to 10 mm in X-direction. In this graph with the measurement recording positions of 1-mm intervals, the actually obtained line measurement data indicated by square measurement points deviates from the measurement recording positions. The PLC 1 performs interval equalization of the sequence of data points to correct the square measurement points to the circle measurement points through interval equalization before generating 2D shape data. The square measurement points are corrected to these interval-equalized circle measurement points by estimating the values of the interval-equalized measurement points through interpolation such as linear interpolation or spline interpolation. For the 2D shape data generated from the interval-equalized sequence of data points, the measurement recording positions (X-direction positions, or X coordinates) may not be recorded. This 2D shape data is recorded as 1D data, which is equivalent to the measurement information from the displacement sensor 7 (information about the height of the object A). The PLC 1 thus reduces the volume of 2D shape data.

Referring back to FIG. 6, the PLC 1 obtains the 2D shape data (step S105) that has undergone the shape correction and the interval equalization of the sequence of data points in step S104. The PLC 1 in step S104 may also perform other processing such as filtering, in addition to the shape correction and the interval equalization of the sequence of data points. Examples of filtering include smoothing and median filtering. When line measurement data is unstable because of the shape or the surface state of the object A, such processing can reduce noise in the line measurement data. Smoothing includes calculating the moving average the specified number of times at each position in X-direction. Median filtering includes defining an area with an X-direction position as the center and replacing a Z-directional value at the position with the median of Z-directional values within the defined area.

Referring back to FIG. 6, the feature quantity calculation unit 180 in the PLC 1 calculates feature quantities (e.g., the height and the cross-sectional area) (step S106) using the 2D shape data obtained in step S105, and ends the control process.

F. Feature Quantity Calculation

The feature quantity calculation performed by the feature quantity calculation unit 180 will now be described in more detail. FIGS. 10A to 11C are diagrams describing the feature quantity calculation in the control system according to one or more embodiments.

F1. Height Calculation

Figure 10A:
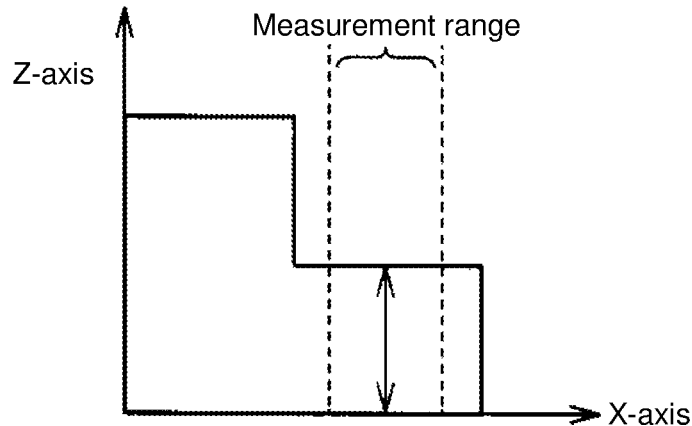
FIGS. 10A to 10C are diagrams illustrating feature quantity calculation in a control system according to one or more embodiments.

In FIG. 10A, the feature quantity calculation unit 180 calculates the height within a defined measurement range using the 2D shape data generated by the 2D shape data generation unit 170. More specifically, the feature quantity calculation unit 180 calculates information about the height of the object A within the measurement range defined by the user from the 2D shape data. The defined measurement range includes at least one piece of shape data. The feature quantity calculation unit 180 can also calculate, for example, the average height in the measurement range, the maximum height in the measurement range (including the X coordinate at that height), and the minimum height in the measurement range (including the X coordinate at that height). For example, the feature quantity calculation unit 180 can inspect the lens top and the screwed condition or measure the level difference in a case edge by calculating the height of an object based on its 2D shape data.

F2. Edge Calculation

Figure 10B:
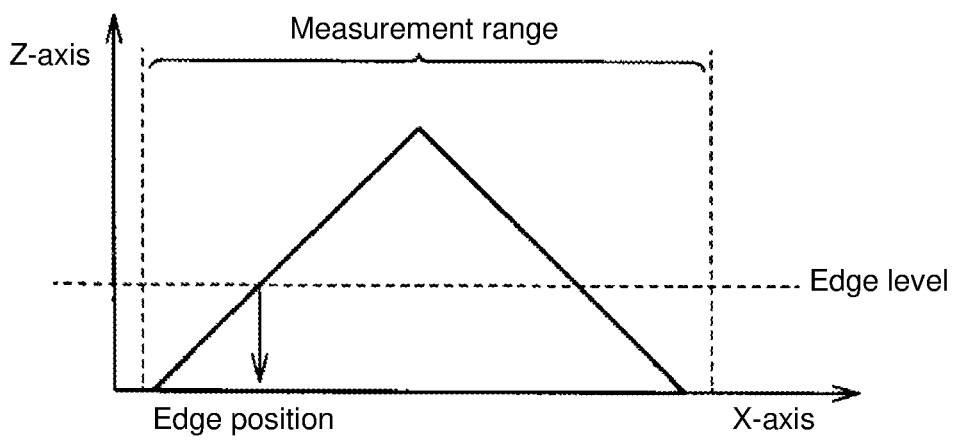

In FIG. 10B, the feature quantity calculation unit 180 calculates the X coordinate at which the height of the object A exceeds a predetermined edge level within a defined measurement range using the 2D shape data generated by the 2D shape data generation unit 170. More specifically, the feature quantity calculation unit 180 calculates, from the 2D shape data, information about the edge position, at which the height of the object A is equal to the edge level within the measurement range defined by the user. The feature quantity calculation unit 180 determines, for example, the edge type being the direction in which the edge level exceeds (rises or falls), the measurement direction depending on either the lower limit or the upper limit within the measurement range is to be measured first, or determines the number of edge excess times depending on the number of times the edge level exceeds before detecting the current excess. For example, the feature quantity calculation unit 180 can detect a battery end or a module end and inspect the battery position or the module position through edge calculation using the 2D shape data. The feature quantity calculation unit 180 can also detect a case end and inspect the case width through edge calculation using the 2D shape data.

F3. Inflection Point Calculation

Figure 10C:
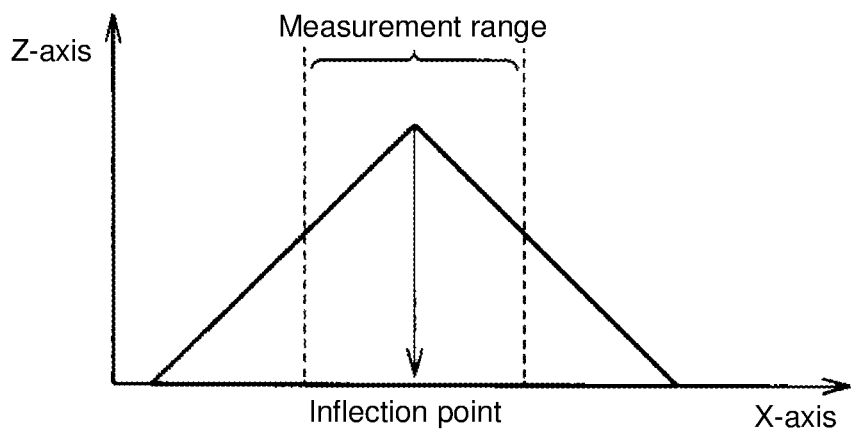

In FIG. 10C, the feature quantity calculation unit 180 calculates an inflection point within a defined measurement range using the 2D shape data generated by the 2D shape data generation unit 170. More specifically, the feature quantity calculation unit 180 calculates the X coordinate of a bend position of the shape data line (inflection point) within the measurement range defined in the 2D shape data. For multiple inflection points within the measurement range, the feature quantity calculation unit 180 calculates the X coordinate of the inflection point that has the highest degree of bend (sensitivity). The feature quantity calculation unit 180 compares the bend degrees (sensitivities) using their absolute values. When multiple inflection points have the same sensitivity, the feature quantity calculation unit 180 outputs the inflection point that has the smallest X coordinate. For example, the feature quantity calculation unit 180 can inspect a crystal angular position through inflection point calculation using the 2D shape data.

F4. Calculating Angle from Horizontal Plane

Figure 11A:
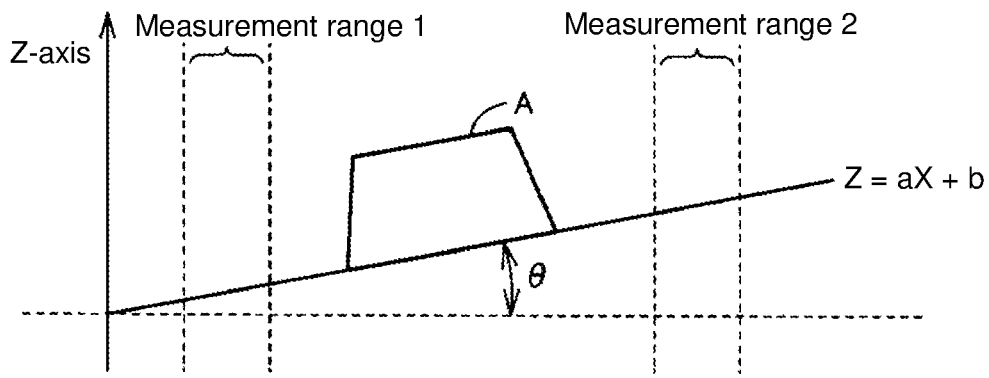
FIGS. 11A to 11C are diagrams illustrating feature quantity calculation in a control system according to one or more embodiments.

In FIG. 11A, the feature quantity calculation unit 180 calculates the angle $\theta$ of the object A from the horizontal plane using the 2D shape data generated by the 2D shape data generation unit 170. More specifically, the feature quantity calculation unit 180 draws a straight line connecting the heights of the 2D shape data in two measurement ranges (a measurement range 1 and a measurement range 2), and calculates the angle $\theta$ formed between the straight line and the horizontal plane. With the horizontal axis being the X-axis and the vertical axis being the Z-axis, the feature quantity calculation unit 180 may also output the slope a of the line of the object A, and the intercept b. For example, the feature quantity calculation unit 180 can inspect a gap between glass planes and a crystal inclination by calculating an angle from the horizontal plane using the 2D shape data.

F5. Calculating Cross-sectional Area

Figure 11B:
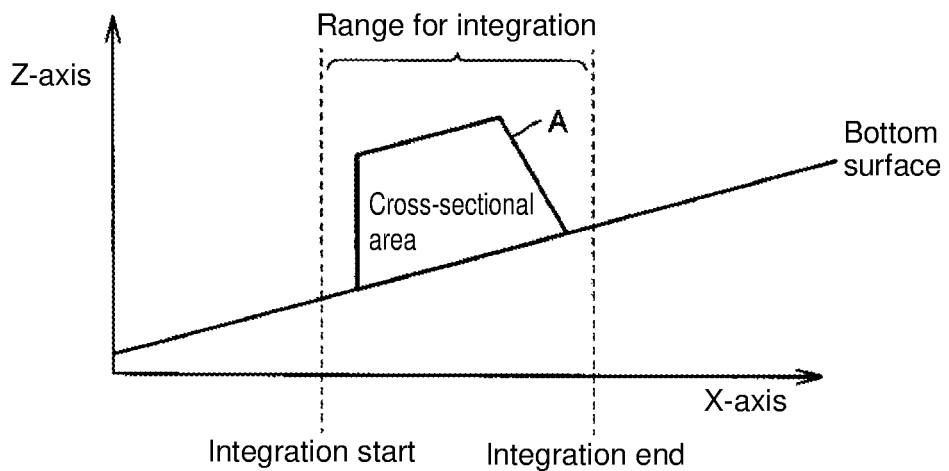

In FIG. 11B, the feature quantity calculation unit 180 calculates the cross-sectional area of the object A using the 2D shape data generated by the 2D shape data generation unit 170. More specifically, the feature quantity calculation unit 180 determines the bottom surface of the object A from the 2D shape data in a defined range for integration, and calculates the surface area of a portion defined by the bottom surface and the waveform of the 2D shape data. For example, the feature quantity calculation unit 180 can inspect a seal shape by calculating its cross-sectional area using the 2D shape data.

F6. Comparison Operation

Figure 11C:
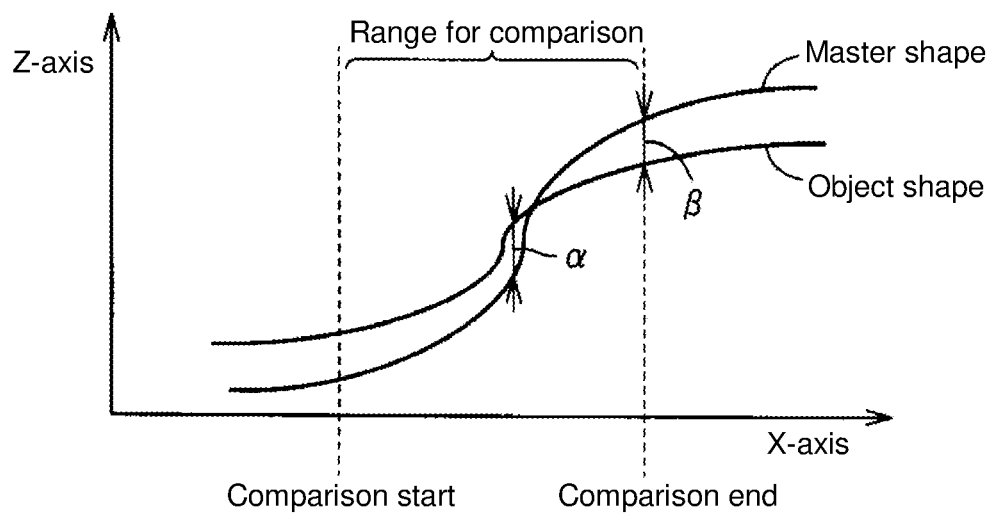

In FIG. 11C, the feature quantity calculation unit 180 compares the master shape and the shape of the object A using the 2D shape data generated by the 2D shape data generation unit 170. More specifically, the feature quantity calculation unit 180 compares the 2D shape data about the master with the 2D shape data about the object within a defined measurement range to calculate their difference in the height (Z-direction). The feature quantity calculation unit 180 obtains a negative difference a when the shape of the object A is smaller than the shape of the master (or the height of the object A is smaller at the same X-directional position). The feature quantity calculation unit 180 obtains a positive difference $\beta$ when the shape of the object A is larger than the shape of the master (or the height of the object A is greater at the same X-directional position). The feature quantity calculation unit 180 may have a tolerance for such differences. When the difference resulting from the comparison falls within the tolerance, the shapes are determined to be the same. For example, the feature quantity calculation unit 180 can inspect the height of a module including multiple components through comparison and calculation using the 2D shape data.

G. Types of Control

Figure 12A:
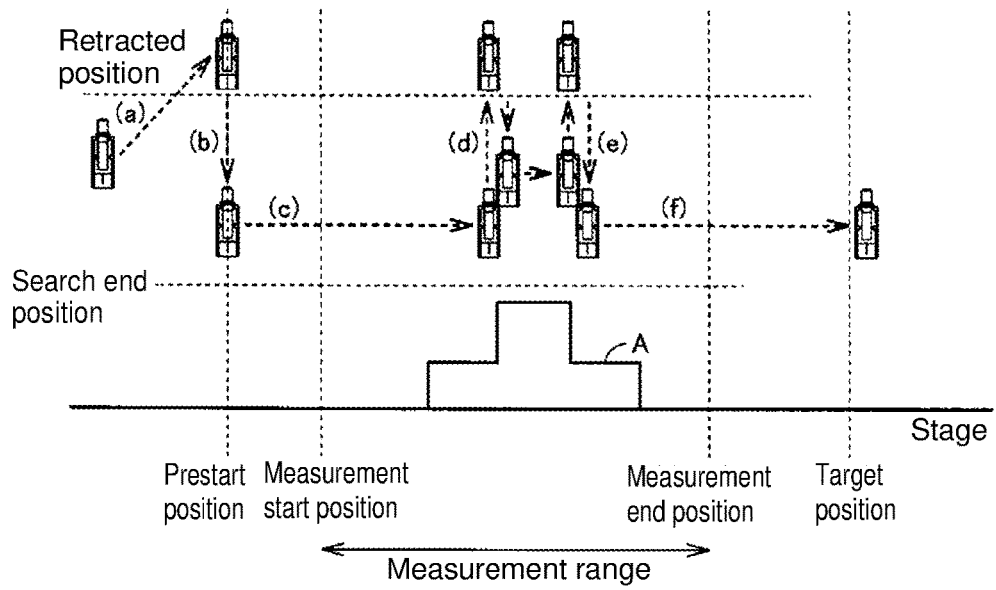
FIGS. 12A and 12B are diagrams illustrating the types of control performed in a control system according to one or more embodiments.
Figure 12B:
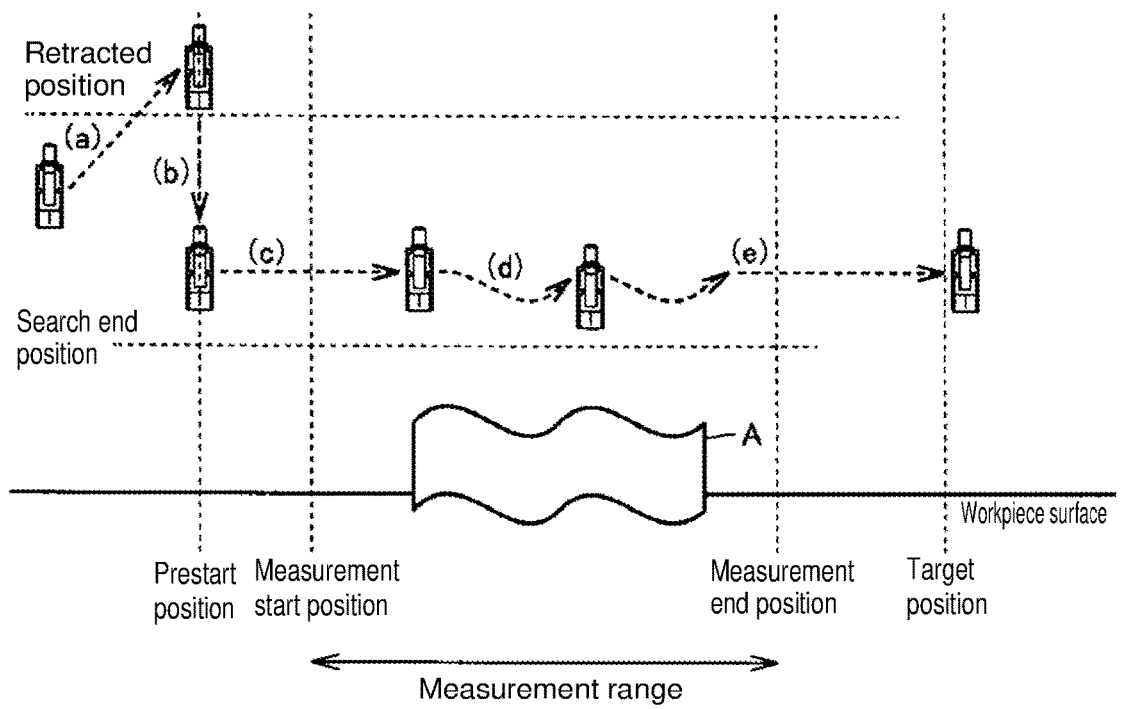

The surface search control and the trace control over the drives 30 and 40 for measuring the shape of the object A will now be described in more detail. FIGS. 12A and 12B are diagrams describing the types of control performed in the control system according to one or more embodiments.

G1. Surface Search Control

FIG. 12A shows the procedure for surface search control. In the surface search control, the PLC 1 first controls the drive 40 to move the displacement sensor 7 from the start position to the prestart position in X-direction and to a retracted position in Z-direction (control (a)). The prestart position and the retracted position are predetermined positions at which the object A is not in contact with the displacement sensor 7. The PLC 1 then moves the displacement sensor 7 in Z-direction for performing measurement positioning at the prestart position (control (b)). The measurement positioning control moves the displacement sensor 7 to a height at which the measurement information obtained by the displacement sensor 7 (information about the height of the object A) indicates 0 for the measurement surface (e.g., the top surface of the stage 31).

More specifically, the PLC 1 performs the measurement positioning control with the procedure below. First, (1) the PLC 1 starts moving the displacement sensor 7 toward a predetermined measurement end position. The measurement end position is set to a position where the displacement sensor 7 is not in contact with the object A. (2) When the displacement sensor 7 is ready for measuring the object (when the measurement surface of the object A enters the measurement range shown in FIG. 7), the PLC 1 moves the displacement sensor 7 to a height at which the measurement information indicates 0. (3) The PLC 1 stops the displacement sensor 7 at the height, where the measurement information indicates 0. (4) When the displacement sensor 7 is still not ready for measuring the object after the displacement sensor 7 reaches the measurement end position, the PLC 1 ends the control.

The PLC 1 then moves the displacement sensor 7 to target positions for measurement between the measurement start position and the measurement end position (control (c)). The PLC 1 may also move the displacement sensor 7 in a negative X-direction. However, the measurement range is to fall within the X-directional movable range of the drive 30. The PLC 1 obtains the position and height as line measurement data at each target position. When the PLC 1 detects an unmeasurable condition during measurement, the PLC 1 performs measurement positioning again (control (d) and control (e)). The factors for such unmeasurable conditions include the optical axis of the displacement sensor 7 being inclined largely (e.g., 25° or more), the object being out of the measurement range (e.g., 2 mm), and the displacement sensor 7 entering a false status based on unstable measurement information. The PLC 1 repeats measurement until the displacement sensor 7 reaches the measurement end position. When the displacement sensor 7 reaches the measurement end position, the measurement is complete (control (f)).

G2. Trace Control

Figure 13:
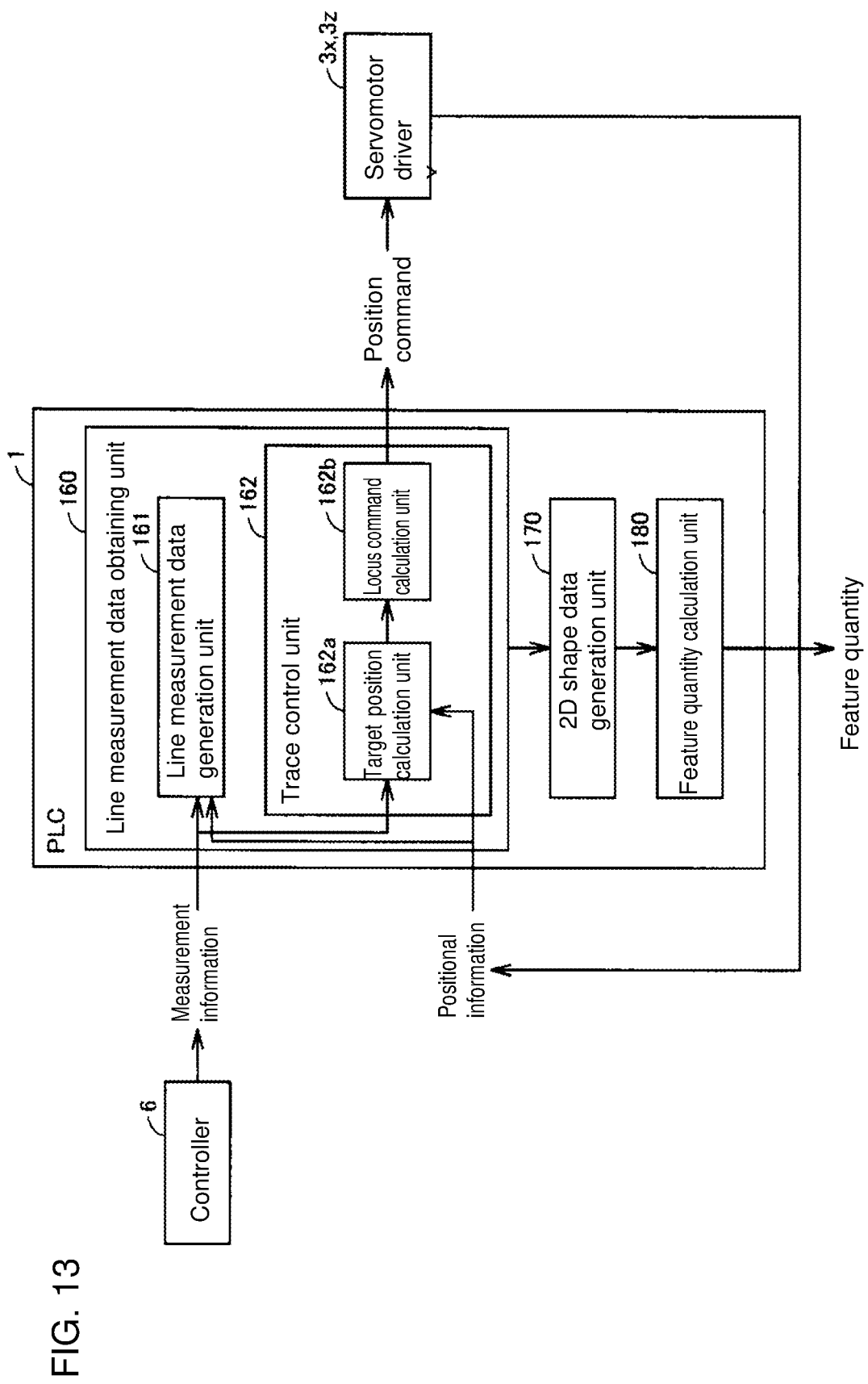
FIG. 13 is a functional block diagram illustrating a line measurement data obtaining unit in a control system according to one or more embodiments.

FIG. 12B shows the procedure for trace control. The trace control moves the displacement sensor 7 to cause the measurement information obtained by the displacement sensor 7 to constantly indicate 0. The PLC 1 includes a line measurement data obtaining unit including a trace control unit that performs trace control. FIG. 13 is a functional block diagram of the line measurement data obtaining unit included in the control system according to one or more embodiments. The line measurement data obtaining unit 160 includes a line measurement data generation unit 161 and a trace control unit 162. The line measurement data generation unit 161 generates line measurement data based on the measurement information obtained from the displacement sensor 7.

The trace control unit 162 includes a target position calculation unit 162a and a locus command calculation unit 162b. Based on the positional information about the displacement sensor 7 (or the positional information from the drive 40), the target position calculation unit 162a calculates target positions at which the measurement information obtained by the displacement sensor 7 constantly indicates 0. More specifically, when the measurement information obtained by the displacement sensor 7 indicates a value increasing by 1 mm, the target position calculation unit 162a generates a position command to lower the position of the displacement sensor 7 by 1 mm to offset the increase. In response to the position command generated by the target position calculation unit 162a, the trace control unit 162 controls the displacement sensor 7 to cause the measurement information to constantly indicate 0.

The locus command calculation unit 162b calculates a locus command that prevents the displacement sensor 7 from moving drastically in response to the position command generated by the target position calculation unit 162a. The locus command calculation unit 162b outputs, to the servomotor drivers 3x and 3z, the position command obtained by combining the position command generated by the target position calculation unit 162a with the calculated locus command. The trace control unit 162, which includes the locus command calculation unit 162b, reduces vibrations of the device by preventing the displacement sensor 7 from moving drastically.

Referring back to FIG. 12B, the PLC 1 controls the drive 40, also in the trace control, to move the displacement sensor 7 from the start position to the prestart position in X-direction and to a retracted position in Z-direction (control (a)). The PLC 1 then moves the displacement sensor 7 in Z-direction for performing measurement positioning at the prestart position (control (b)). The measurement positioning is the same control as the measurement positioning in the surface search control.

The PLC 1 then moves the displacement sensor 7 to target positions for measurement between the measurement start position and the measurement end position (control (c)). The PLC 1 may also move the displacement sensor 7 in a negative X-direction. However, the measurement range is to fall within the X-directional movable range of the drive 30. The PLC 1 changes the position of the displacement sensor 7 along the measurement surface of the object A while moving within the measurement range. While changing the position of the displacement sensor 7 in this manner, the PLC 1 obtains the position and height as line measurement data at each target position (control (d)). When the measurement information does not indicate 0, the PLC 1 moves the displacement sensor 7 by a distance that equates the difference between the position at which the measurement information does not indicate 0 and the zero position. When, for example, the measurement information indicates 1 mm, the PLC 1 raises the displacement sensor 7 by 1 mm. When the measurement information indicates −1 mm, the PLC 1 lowers the displacement sensor 7 by 1 mm.

When the PLC 1 detects an unmeasurable condition during measurement, the PLC 1 performs measurement positioning again. As in the surface search control, the factors for such unmeasurable conditions include the optical axis of the displacement sensor 7 being inclined largely (e.g., 25° or more), the object being out of the measurement range (e.g., 2 mm), and the displacement sensor 7 entering a false status based on unstable measurement information. The PLC 1 repeats measurement until the displacement sensor 7 reaches the measurement end position. When the displacement sensor 7 reaches the measurement end position, the measurement is complete (control (e)).

H. Comparison Process

Figure 14:
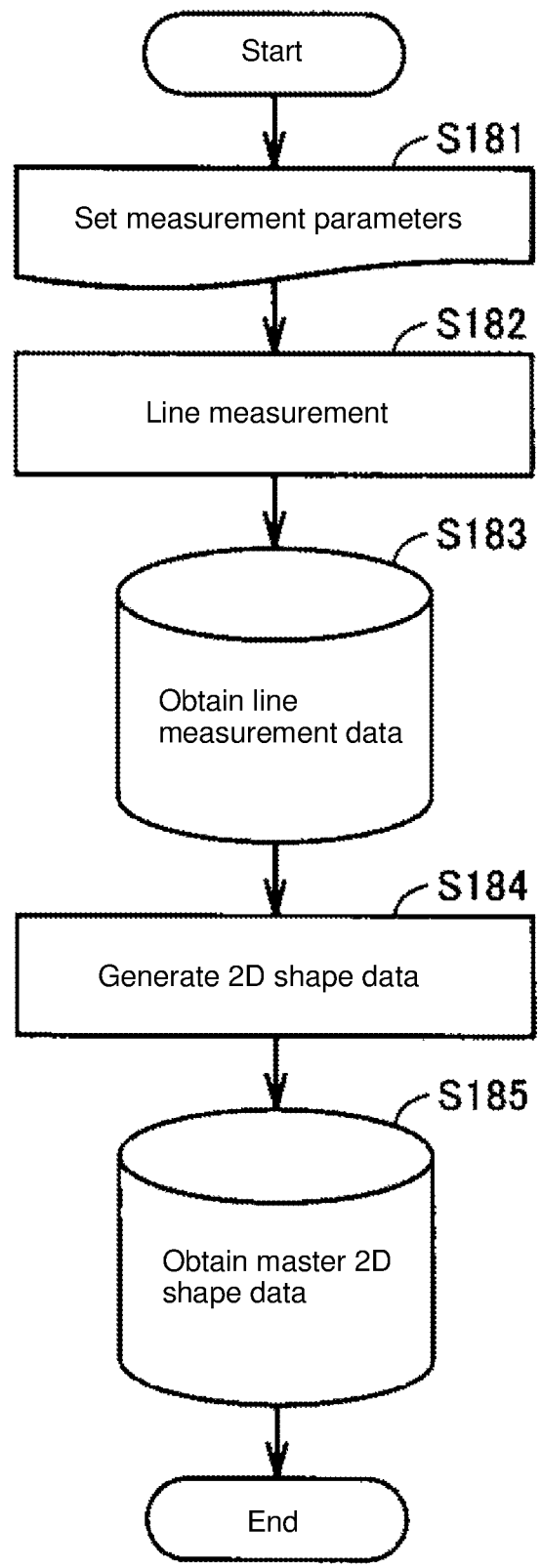
FIG. 14 is a flowchart illustrating a control process performed by a control system according to one or more embodiments.

A comparison process performed in the PLC system SYS will now be described. In the comparison process, the PLC system SYS compares an object registered as the master with the measured object through a comparison operation performed by the feature quantity calculation unit 180 to determine whether the comparison result falls within a tolerance. FIG. 14 is a flowchart showing a control process performed by the control system according to one or more embodiments. Whereas obtaining the 2D shape data about the object A is described with reference to FIG. 6, obtaining the 2D shape data about the master will now be described with reference to FIG. 14.

First, the PLC 1 sets measurement parameters (step S181) as in step S101 in FIG. 6. The PLC 1 then performs line measurement (step S182) and obtains, as line measurement data (step S183) as in steps S102 and S103 in FIG. 6, multiple pieces of measurement information (information about the height of the master) from the displacement sensor 7 and multiple pieces of positional information (X coordinate information and Z coordinate information) from the drives 30 and 40, which are obtained at measurement recording positions while the PLC 1 is changing the position of the displacement sensor 7 within the measurement range.

The PLC 1 then generates 2D shape data based on the line measurement data obtained in step S183 (step S184), and obtains master 2D shape data that has undergone shape correction and interval equalization of the sequence of data points in step S184 (step S185) as in steps S104 and S105 in FIG. 6. The 2D shape data generated in step S185 from the interval-equalized sequence of data points is recorded as 1D data (1D arrangement information), which is equivalent to the measurement information from the displacement sensor 7 (information about the height of the object A). The PLC 1 thus reduces the size of data.

Figure 15:
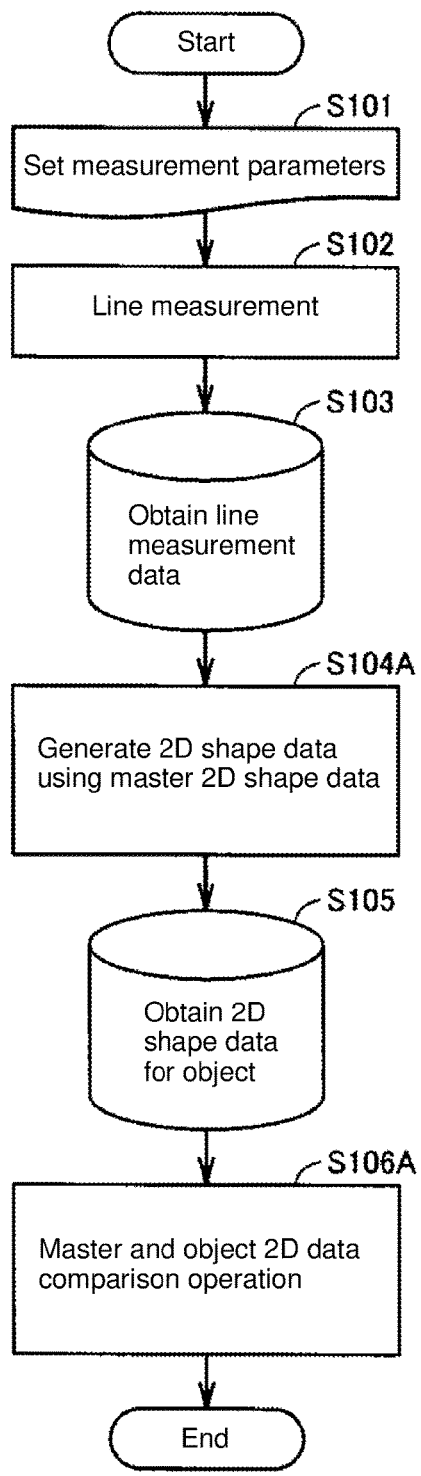
FIG. 15 is a flowchart illustrating a control process performed by a control system according to one or more embodiments.

FIG. 15 is a flowchart showing a control process performed by the control system according to one or more embodiments. The process in FIG. 15 differs from the process in FIG. 6 in steps S104 and S106.

In step S104A, which is a variant of step S104 in FIG. 6, the PLC 1 uses the master 2D shape data obtained through the process shown in FIG. 14 to generate 2D shape data based on the line measurement data obtained in step S103. More specifically, the correction process aligns the object 2D shape data with the inclination, the reference position in X-direction, and the reference position in Z-direction of the master 2D shape data. The corrected 2D shape data has the same position and the same inclination as the master 2D shape data.

The resolution for the master 2D shape data is also used as the resolution for the line measurement of the object. The corrected parameters for the master 2D shape data are also used as corrected parameters when the object 2D shape data is generated.

In step S106A, which is a variant of step S106 in FIG. 6, the PLC 1 compares the master 2D shape data obtained through the process shown in FIG. 14 with the object 2D shape data obtained in step S105. The overview of the comparison operation is shown in FIG. 11C. In step S106A, two pieces of 2D shape data to be compared have both undergone interval equalization, and the Z-directional values of these pieces of 2D shape data are simply compared.

Figure 16:
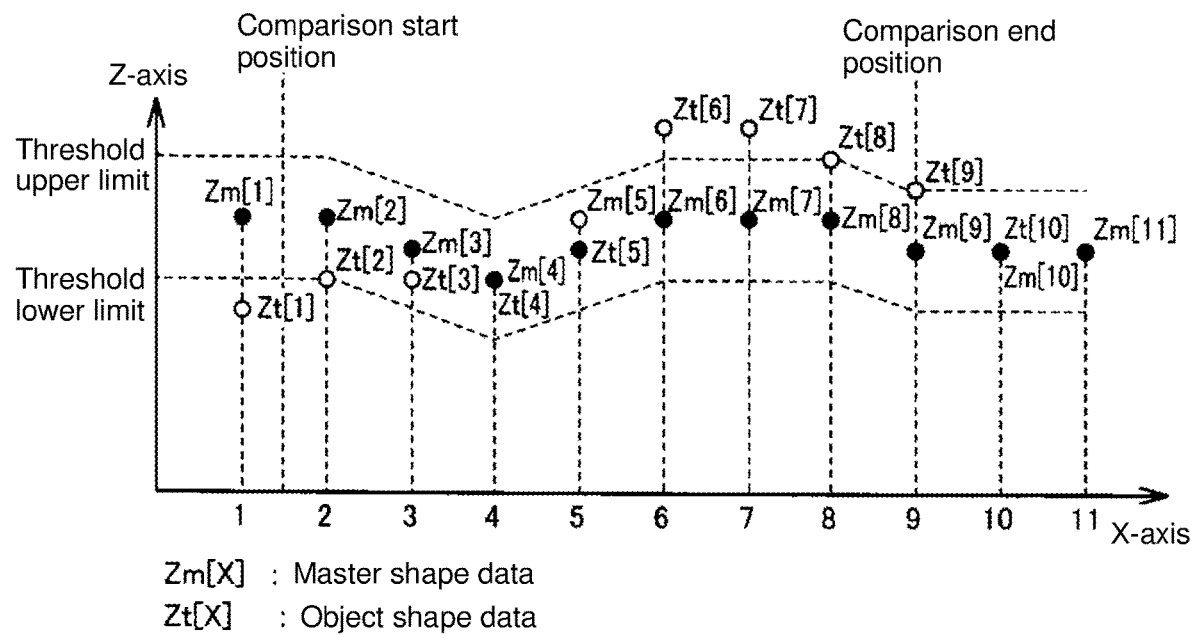
FIG. 16 is a diagram illustrating a 2D shape data comparison operation according to one or more embodiments.

FIG. 16 is a diagram describing a 2D shape data comparison operation according to one or more embodiments. The comparison operation is performed in the range from a comparison start position to a comparison end position. In the example shown in FIG. 16, pieces of 2D shape data having the X coordinates of 2 to 9 are to be compared.

The tolerance is a range of values defined using the X-coordinate value of each piece of master 2D shape data $Zm[X]$ as a reference, the upper limit being the value of $Zm[X]$ to which a predetermined threshold is added, and the lower limit being the value of $Zm[X]$ from which a predetermined threshold is subtracted.

When the value of the 2D shape data $Zt[X]$ for the object falls within the tolerance, the master and the object are determined to have the same shape. In the example shown in FIG. 16, the 2D shape data $Zt[6]$ and the 2D shape data $Zt[7]$ for the object at the X coordinates of 6 and 7 fall out of the tolerance. The master and the object are thus determined not to have the same shape.

The comparison operation includes outputting the maximum differences in the positive Z-direction and the negative Z-direction, and the positions at which these maximum differences are detected. In the example shown in FIG. 16, the maximum difference in the positive direction is written as $Zt[6]-Zm[6]$, and its detection position is the X coordinate of 6, whereas the maximum difference in the negative direction is written as $Zt[2]-Zm[2]$, and its detection position is the X coordinate of 2.

In this manner, the PLC system SYS according to one or more embodiments is a control system including the displacement sensor 7, the drives 30 and 40, and the PLC 1. This system uses multiple pieces of measurement information (1D information) from the displacement sensor 7 and multiple pieces of positional information from the drives 30 and 40, which are read in accordance with the measurement intervals (measurement recording positions). The PLC system SYS obtains these multiple pieces of information as line measurement data, and generates 2D shape data as 1D arrangement information for every measurement interval from the line measurement data combining the 1D information and the positional information. The PLC system SYS thus generates 2D shape data that is smaller than shape data generated as equivalent to the line measurement data. The 2D shape data uses a smaller space in the main memory 104 or the nonvolatile memory 106 in the CPU 13 included in the PLC 1.

The feature quantity calculation unit 180 calculates various feature quantities of the object A (e.g., the height and the cross-sectional area) using the 2D shape data generated by the 2D shape data generation unit 170.

The feature quantity calculation unit 180 also compares pieces of 1D arrangement information for two pieces of 2D shape data about the object A, or specifically the master 2D shape data and the 2D shape data about the object A, which are both generated by the 2D shape data generation unit 170. The feature quantity calculation unit 180 calculates a feature quantity using the result of comparison between the two pieces of 2D shape data. In this manner, 1D arrangement information is used for comparison. The processing load for the comparison operation is smaller than when the 2D shape data including the positional data in X-direction is directly used for the comparison. This structure allows for faster processing.

The 2D shape data generation unit 170 can define the measurement range and the measurement intervals for measuring the master and the object A. The PLC system SYS thus has high scalability in measuring the master and the object A.

The PLC 1, which functions as the master device, is connected with the network to the measurement device 20, the drives 30 and 40, and the remote IO terminal 5, which function as the slave devices. The PLC system SYS thus has high configuration flexibility.

Modifications (1) The PLC system SYS according to one or more embodiments changes the relative position of the displacement sensor 7 relative to the object A by causing the drive 30 to move the stage 31 in X-direction and causing the drive 40 to move the displacement sensor 7 in Z-direction. However, the embodiment is not limited to this structure. The PLC system SYS may change the relative position of the displacement sensor 7 relative to the object A by causing the drive 30 to move the stage 31 in both X-direction and Z-direction or by causing the drive 40 to move the displacement sensor 7 in both X-direction and Z-direction.

(2) The PLC system SYS according to one or more embodiments generates 2D shape data by causing the drive 30 to move the stage 31 in X-direction. However, the embodiment is not limited to this structure. The PLC system SYS may generate 3D shape data by causing the drive 30 to move the stage 31 in both X-direction and Y-direction. The PLC system SYS may also generate 3D shape data by causing the drive 30 to move the stage 31 in X-direction and causing the drive 40 to move the displacement sensor 7 in both Y-direction and Z-direction.

(3) The PLC system SYS according to one or more embodiments generates the 2D shape data using the single displacement sensor 7 included in the measurement device 20. However, the embodiment is not limited to this structure. The PLC system SYS may generate 2D shape data using multiple displacement sensors 7 included in the measurement device 20. The multiple displacement sensors 7 in the PLC system SYS allow line measurement data to be obtained promptly. This shortens the time taken to generate the 2D shape data.

(4) The PLC system SYS according to one or more embodiments includes the displacement sensor 7 that is a contactless white confocal displacement sensor. However, the PLC system SYS may include a contactless displacement sensor with another scheme, or a contact displacement sensor including a dial gauge or a differential transformer to produce the same advantageous effects.

The embodiments disclosed herein should be considered to be in all respects illustrative and not restrictive. The scope of the invention is not defined by the embodiments described above but is defined by the appended claims, and all changes that come within the meaning and range of equivalency of the claims are intended to fall within the claims.

REFERENCE SIGNS LIST

1 PLC
2 field network
3x, 3z servomotor driver
4x, 4z servomotor
5 remote IO terminal
6 controller
7 displacement sensor
8 PLC support apparatus
10 connection cable
11 system bus
12 power supply unit
13 CPU
14, 53 IO unit
15 special unit
20 measurement device
30, 40 drive
31 stage
51 remote IO terminal bus
52 communication coupler
100 microprocessor
102 chipset
104 main memory
106 nonvolatile memory
160 line measurement data obtaining unit
161 line measurement data generation unit
162 trace control unit
162a target position calculation unit
162b locus command calculation unit
170 2D shape data generation unit
180 feature quantity calculation unit
230 control program
300 programmable display

The invention claimed is:

1. A control system, comprising:
a displacement sensor configured to obtain one-dimensional information about an object;
a drive configured to change a relative position of the displacement sensor relative to the object;
a controller configured to control the displacement sensor and the drive to obtain information about a two-dimensional shape or a three-dimensional shape of the object based on the one-dimensional information obtained by the displacement sensor; and
a processor configured with a program to perform operations comprising:
operation as a measurement data obtaining unit configured to obtain measurement data comprising a plurality of pieces of one-dimensional information from the displacement sensor and a plurality of pieces of positional information from the drive that are read at each measurement recording position determined based on a measurement range and a measurement resolution comprising one or more measurement intervals; and
operation as a shape data generation unit configured to generate two-dimensional shape data or three-dimensional shape data based on the measurement data obtained by the measurement data obtaining unit, wherein
the processor is configured with the program to perform operations such that operation as the shape data generation unit comprises operation as the shape data generation unit that generates the two-dimensional shape data or the three-dimensional shape data as one-dimensional arrangement information for every measurement interval of the one or more measurement intervals from a combination measurement data combining the plurality of pieces of one-dimensional information and the plurality of pieces of positional information.

2. The control system according to claim 1, wherein the processor is configured with the program to perform operations further comprising operation as a feature quantity calculation unit configured to calculate a feature quantity of the object based on the two-dimensional shape data or the three-dimensional shape data generated by the shape data generation unit.

3. The control system according to claim 2, wherein the processor is configured with the program to perform operations such that
operation as the feature quantity calculation unit comprises operation as the feature quantity calculation unit that compares pieces of one-dimensional arrangement information for two pieces of shape data generated by the shape data generation unit, and calculates the feature quantity using a result of comparison between the two pieces of shape data.

4. The control system according to claim 3, wherein the processor is configured with the program to perform operations such that
operation as the shape data generation unit comprises operation as the shape data generation unit that defines the measurement range and the one or more measurement intervals for measuring the object.

5. The control system according to claim 4, wherein the controller functioning as a master device and the displacement sensor and the drive functioning as slave devices are connected through a network.

6. The control system according to claim 3, wherein the controller functioning as a master device and the displacement sensor and the drive functioning as slave devices are connected through a network.

7. The control system according to claim 2, wherein the processor is configured with the program to perform operations such that
operation as the shape data generation unit comprises operation as the shape data generation unit that defines the measurement range and the one or more measurement intervals for measuring the object.

8. The control system according to claim 7, wherein the controller functioning as a master device and the displacement sensor and the drive functioning as slave devices are connected through a network.

9. The control system according to claim 2, wherein the controller functioning as a master device and the displacement sensor and the drive functioning as slave devices are connected through a network.

10. The control system according to claim 1, wherein the processor is configured with the program to perform operations such that
operation as the shape data generation unit comprises operation as the shape data generation unit that defines the measurement range and the one or more measurement intervals for measuring the object.

11. The control system according to claim 10, wherein the controller functioning as a master device and the displacement sensor and the drive functioning as slave devices are connected through a network.

12. The control system according to claim 1, wherein the controller functioning as a master device and the displacement sensor and the drive functioning as slave devices are connected through a network.

13. A control method used by a controller for controlling a displacement sensor configured to obtain one-dimensional information about an object, and a drive configured to change a relative position of the displacement sensor relative to the object to obtain information about a two-dimensional shape or a three-dimensional shape of the object based on the one-dimensional information obtained by the displacement sensor, the method comprising:
obtaining measurement data comprising a plurality of pieces of one-dimensional information from the displacement sensor and a plurality of pieces of positional information from the drive that are read at each measurement recording position determined based on a measurement range and a measurement resolution comprising one or more measurement intervals; and
generating two-dimensional shape data or three-dimensional shape data based on the obtained measurement data, wherein
generating the two-dimensional shape data or the three-dimensional shape data comprises generating the two-dimensional shape data or the three-dimensional shape data as one-dimensional arrangement information for every measurement interval of the one or more measurement intervals from a combination measurement data combining the plurality of pieces of one-dimensional information and the plurality of pieces of positional information.

14. A non-transitory computer-readable storage medium storing a program for a controller that controls a displacement sensor configured to obtain one-dimensional information about an object, and a drive configured to change a relative position of the displacement sensor relative to the object to obtain information about a two-dimensional shape or a three-dimensional shape of the object based on the one-dimensional information obtained by the displacement sensor, the program causing a processor to perform operations comprising:
obtaining measurement data including a plurality of pieces of one-dimensional information from the displacement sensor and a plurality of pieces of positional information from the drive that are read at each measurement recording position determined based on a measurement range and a measurement resolution comprising one or more measurement intervals; and
generating two-dimensional shape data or three-dimensional shape data based on the obtained measurement data, wherein
generating the two-dimensional shape data or the three-dimensional shape data comprises generating the two-dimensional shape data or the three-dimensional shape data as one-dimensional arrangement information for every measurement interval of the one or more measurement intervals from a combination measurement data combining the plurality of pieces of one-dimensional information and the plurality of pieces of positional information.

\* \* \* \* \*